United States Patent
Matsuoka et al.

(10) Patent No.: US 10,245,550 B2
(45) Date of Patent: Apr. 2, 2019

(54) SEPARATION METHOD AND SEPARATION DEVICE

(71) Applicant: Kabushiki Kaisha Kobe Seiko Sho (Kobe Steel, Ltd.), Kobe-shi (JP)

(72) Inventors: Akira Matsuoka, Kobe (JP); Akitoshi Fujisawa, Kobe (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 548 days.

(21) Appl. No.: 14/895,412

(22) PCT Filed: Jul. 14, 2014

(86) PCT No.: PCT/JP2014/068716
§ 371 (c)(1),
(2) Date: Dec. 2, 2015

(87) PCT Pub. No.: WO2015/012147
PCT Pub. Date: Jan. 29, 2015

(65) Prior Publication Data
US 2016/0114282 A1 Apr. 28, 2016

(30) Foreign Application Priority Data

Jul. 26, 2013 (JP) .................. 2013-155659

(51) Int. Cl.
*B01D 53/14* (2006.01)
*B01D 53/18* (2006.01)

(52) U.S. Cl.
CPC ..... *B01D 53/1425* (2013.01); *B01D 53/1475* (2013.01); *B01D 53/18* (2013.01); *Y02C 10/06* (2013.01)

(58) Field of Classification Search
CPC ............ B01D 53/1425; B01D 53/1475; B01D 53/18; Y02C 10/06
See application file for complete search history.

(56) References Cited

U.S. PATENT DOCUMENTS 2,826,266 A * 3/1958 Hachmuth ......... B01D 53/1475
62/635
3,563,695 A 2/1971 Benson
(Continued)

FOREIGN PATENT DOCUMENTS

EP 2 181 754 A1 5/2010
EP 2 554 241 A1 2/2013
(Continued)

OTHER PUBLICATIONS

Machine translation of JP-2012161750 accessed Jun. 24, 2018.*
(Continued)

*Primary Examiner* — Cabrena Holecek
(74) *Attorney, Agent, or Firm* — Oblon, McClelland, Maier & Neustadt, L.L.P.

(57) ABSTRACT

A separation method including: an absorption process absorbing a desired component in a starting material gas into an absorption liquid by bringing the starting material gas and the absorption liquid into contact with each other inside an absorption unit; a regeneration process releasing the desired component from the absorption liquid and regenerating the absorption liquid by heating the absorption liquid, which absorbed the desired component in the absorption process, in a regeneration unit; a post-regeneration separation process separating the mixed fluid, which is the gas of the desired component released in the regeneration process and the regenerated absorption liquid, into the desired component gas and the absorption liquid; and a compression process compressing the starting material gas prior to the absorption process and the regeneration process.

7 Claims, 16 Drawing Sheets

(56) References Cited

U.S. PATENT DOCUMENTS

| | | | |
|---|---|---|---|
| 3,823,222 A | 7/1974 | Benson | |
| 8,475,566 B2 * | 7/2013 | Find | B01D 53/002 |
| | | | 62/617 |
| 8,535,028 B2 | 9/2013 | Inoue et al. | |
| 2009/0071335 A1 | 3/2009 | Tonkovich et al. | |
| 2010/0229723 A1 * | 9/2010 | Gelowitz | B01D 53/1425 |
| | | | 95/162 |
| 2013/0095016 A1 | 4/2013 | Miyagawa et al. | |
| 2013/0205796 A1 | 8/2013 | Christensen et al. | |

FOREIGN PATENT DOCUMENTS

| | | | |
|---|---|---|---|
| JP | 2010-022986 A | | 2/2010 |
| JP | 2012-161750 A | | 8/2012 |
| JP | 2012161750 A | * | 8/2012 |
| WO | 2009/017832 A1 | | 2/2009 |
| WO | WO 2012/055715 A2 | | 5/2012 |

OTHER PUBLICATIONS

Extended European Search Report dated Feb. 20, 2017 in Application No. 14829805.2.

International Search Report and Written Opinion of the International Searching Authority dated Oct. 21, 2014, for PCT/JP14/68716 Filed Jul. 14, 2014.

* cited by examiner

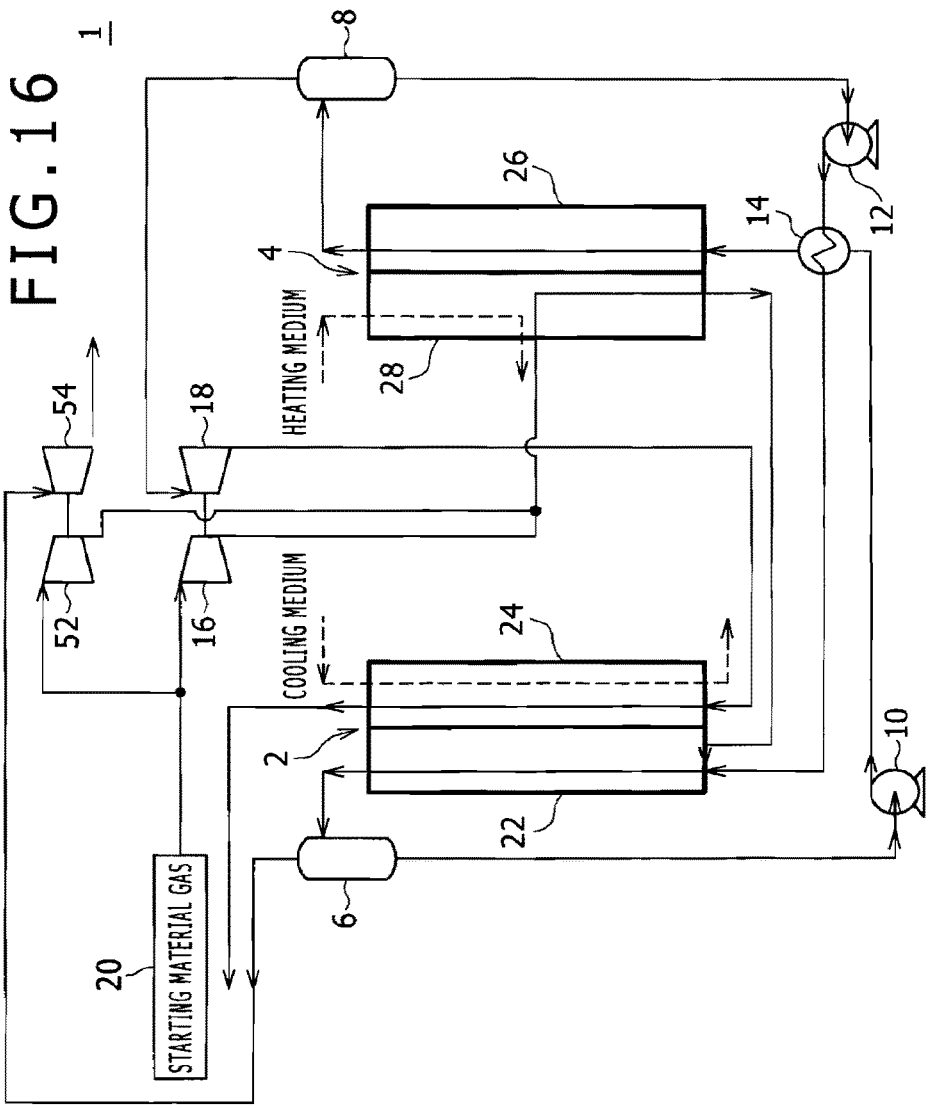

SEPARATION METHOD AND SEPARATION DEVICE

TECHNICAL FIELD

The present invention relates to a separation method and a separation device for separating a desired component from a mixed gas.

BACKGROUND ART

A separation method for separating a desired component from a mixed gas has been conventionally known. For example, Patent Document 1 discloses one example of such a separation method as follows.

Patent Document 1 below discloses a method for separating and recovering carbon dioxide as a desired component from an exhaust gas, which is a mixed gas. Further, Patent Document 1 discloses, as a separation device for carrying out the separation and recovery method, a carbon dioxide recovery device comprising an absorption tower for absorbing carbon dioxide in the exhaust gas into an absorption liquid and a regeneration tower for separating and recovering carbon dioxide from the absorption liquid having absorbed carbon dioxide in the absorption tower and regenerating the absorption liquid into a fresh state. In the absorption tower, carbon dioxide in the exhaust gas is absorbed in the absorption liquid by bringing the exhaust gas into contact with the absorption liquid. Then, in the regeneration tower, the absorption liquid having absorbed carbon dioxide in the absorption tower is heated for the purpose of releasing and separating carbon dioxide from the absorption liquid, thus the absorption liquid is regenerated. The regenerated absorption liquid is then used again for absorbing carbon dioxide in the absorption tower. Subsequently, this whole process is repeated.

However, a conventional separation method requires a large amount of energy for heating the absorption liquid for the purpose of releasing carbon dioxide from the absorption liquid in the regeneration tower. Further, in the absorption process for absorbing carbon dioxide into the absorption liquid in the absorption tower, an absorption amount of carbon dioxide per unit liquid volume of the absorption liquid is small, thus an absorption efficiency is poor. In order to secure a sufficient absorption amount of carbon dioxide in such an absorption process, it is necessary to increase a liquid volume of the absorption liquid, which in turn requires an increase in size of the separation device.

CITATION LIST

Patent Document

Patent Document 1: JP 2010-22986 A

SUMMARY OF THE INVENTION

An object of the present invention is to improve an absorption efficiency of a desired component in an absorption process while reducing energy consumption and preventing an increase in size of a separation device.

A separation method according to one aspect of the present invention is a separation method for separating a desired component from a starting material gas by using a separation device comprising: an absorption device for absorbing the desired component into an absorption liquid from the starting material gas, which is a mixed gas containing the desired component as an object to be separated; and a regeneration device for releasing the desired component from the absorption liquid having absorbed the desired component in the absorption device to regenerate the absorption liquid. The separation method comprises: an absorption process for absorbing the desired component in the starting material gas into the absorption liquid by bringing the starting material gas and the absorption liquid into contact with each other inside of the absorption device; a regeneration process for releasing the desired component from the absorption liquid to regenerate the absorption liquid by heating the absorption liquid having absorbed the desired component in the absorption process, in the regeneration device; a post-regeneration separation process for separating a mixed fluid consisting of the desired component gas released in the regeneration process and the regenerated absorption liquid into the desired component gas and the absorption liquid; and a compression process for compressing the starting material gas to generate compression heat in the starting material gas prior to the absorption process and the regeneration process. In the regeneration process, the absorption liquid is heated by supplying the starting material gas compressed in the compression process to the regeneration device and heat exchanging the starting material gas with the absorption liquid. In the absorption process, the starting material gas, which has been compressed in the compression process and undergone heat exchange with the absorption liquid in the regeneration device, is supplied to the absorption device as a starting material gas from which the desired component is to be absorbed into the absorption liquid.

The separation device according to another aspect of the present invention is a separation device for separating a desired component from a starting material gas, which is a mixed gas containing the desired component as an object to be separated. The separation device comprises: an absorption device for absorbing the desired component in the starting material gas into an absorption liquid by bringing the introduced starting material gas and the absorption liquid into contact with each other; a regeneration device for releasing the desired component from the absorption liquid having absorbed the desired component in the absorption device and regenerating the absorption liquid; a regeneration-side separator, connected to the regeneration device so that a mixed fluid consisting of the desired component gas released in the regeneration device and the regenerated absorption liquid is introduced from the regeneration device to the regeneration-side separator, for separating the introduced mix fluid into the desired component gas and the absorption liquid; and a compressor for compressing the starting material gas to generate compression heat in the starting material gas. The regeneration device comprises: a regeneration unit, connected to the absorption device so that the absorption liquid having absorbed the desired component in the absorption device is introduced from the absorption device into the regeneration unit, for releasing the desired component from the introduced absorption liquid and regenerating the absorption liquid; and a temperature controlling unit for regeneration device, connected to the compressor so that the starting material gas compressed in the compressor is introduced from the compressor to the temperature controlling unit for regeneration device, for heating the absorption liquid introduced into the regeneration unit by performing heat exchange between the introduced starting material gas and the absorption liquid introduced into the regeneration unit. The absorption device is connected to the temperature controlling unit for regeneration device so that the starting material gas, which has been compressed by the compressor and undergone heat exchange with the absorption liquid in the temperature controlling unit for regeneration device, is introduced into the absorption device.

BRIEF DESCRIPTION OF DRAWINGS

FIG. 16 is a schematic view of a configuration of a separation device according to a fourth modified example of one embodiment of the present invention.

DESCRIPTION OF EMBODIMENTS

Hereinafter, embodiments of the present invention will be described with reference to the drawings.

First, a configuration of a separation device 1 used in a separation method according to one embodiment of the present invention will be explained with reference to FIG. 1 to FIG. 10.

Figure 1:
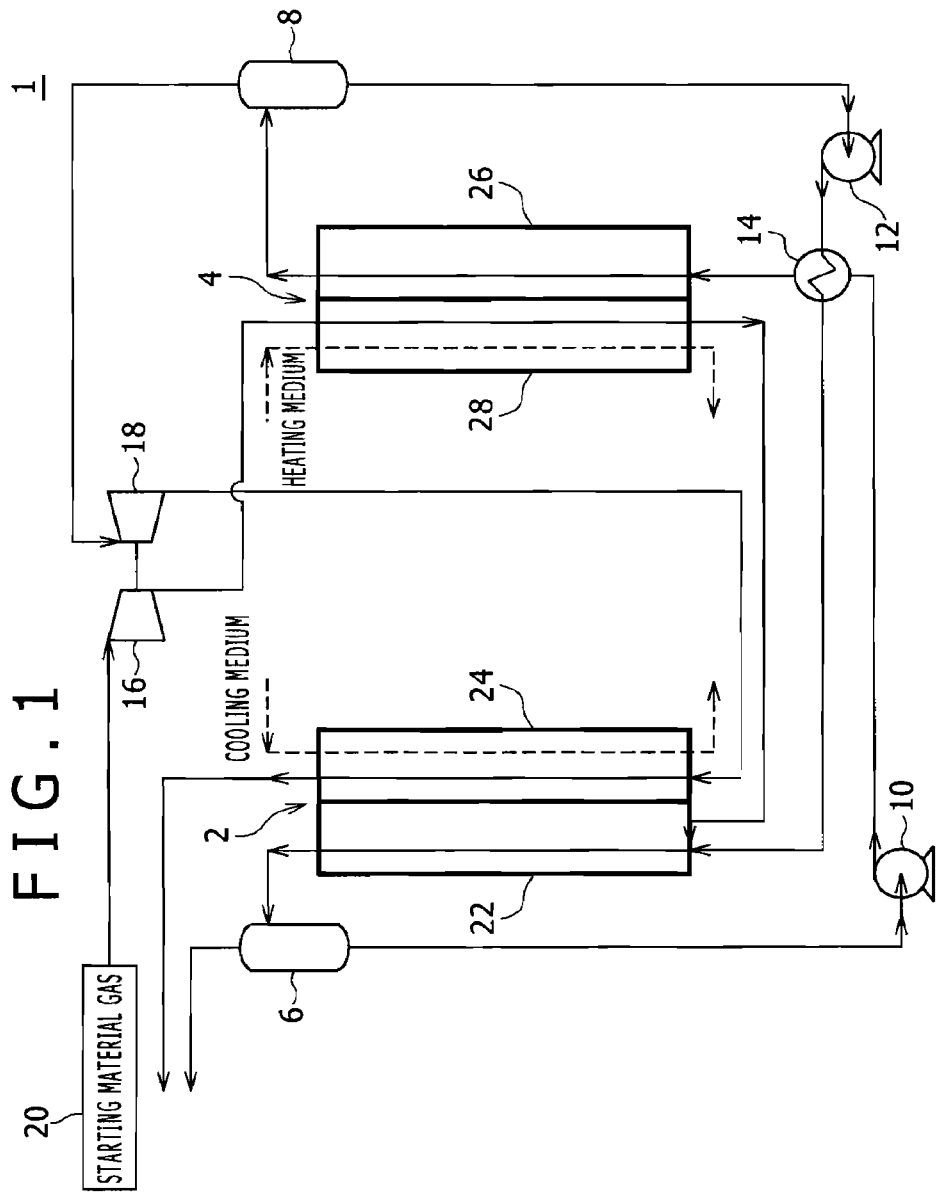
FIG. 1 is a schematic view of a configuration of a separation device according to one embodiment of the present invention.

FIG. 1 shows an entire configuration of the separation device 1 according to the present embodiments. As shown in FIG. 1, the separation device 1 comprises an absorption device 2, a regeneration device 4, an absorption-side separator 6, a regeneration-side separator 8, an absorption-side pump 10, a regeneration-side pump 12, a heat exchanger 14, a compressor 16, and an expander 18.

Figure 2:
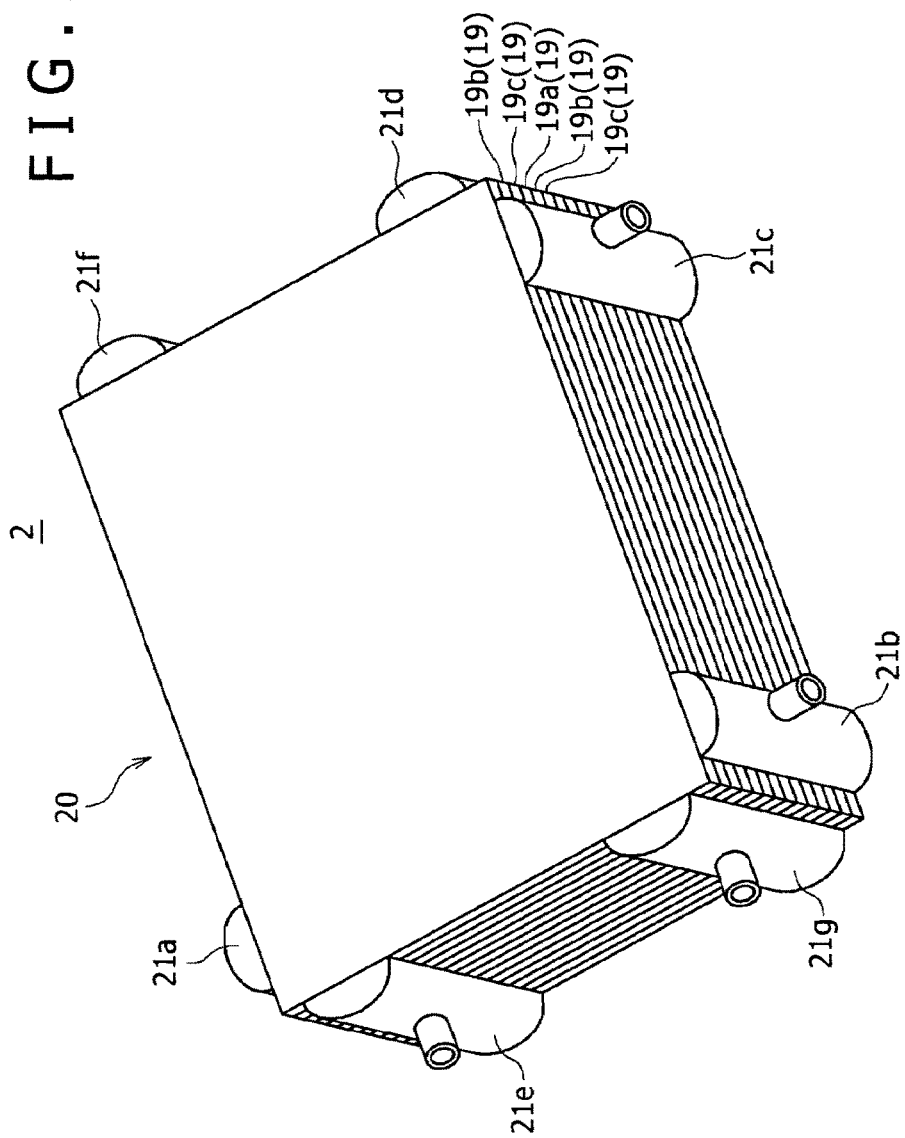
FIG. 2 is a perspective view of an absorption device of the separation device shown in FIG. 1.

The absorption device 2 is a device, by bringing a starring material gas as a mixed gas and an absorption liquid into contact with each other, for absorbing a desired component gas as an object to be separated in the starting material gas into the absorption liquid. The absorption device 2 comprises an absorption unit 22 for performing a process of absorbing the desired component in the starting material gas into the absorption liquid, and a temperature controlling unit for absorption device 24 for adjusting temperatures of the starting material gas and the absorption liquid circulated in the absorption unit 22. FIG. 1 schematically shows the absorption unit 22 and the temperature controlling unit for absorption device 24 of the absorption device 2, while a specific structure of the absorption device 2 is shown in FIG. 2. Specifically, the absorption device 2 comprises a laminate 20 consisting of a plenty of laminated plates 19. A plenty of passages disposed inside the laminate 20 form the absorption unit 22 and the temperature controlling unit for absorption device 24.

Specifically, a plenty of the plates 19 forming the laminate 20 include a plurality of absorption plates 19a, a plurality of first temperature controlling plates for absorption device 19b, and a plurality of second temperature controlling plates for absorption device 19b. Hereinafter, the first temperature controlling plate for absorption device 19b is simply referred to as a first temperature controlling plate 19b. Further, the second temperature controlling plate for absorption device 19c is simply referred to as a second temperature controlling plate 19c. The absorption unit 22 comprises a plurality of absorption passages 22a (see FIG. 3) disposed in the each absorption plate 19a. The temperature controlling unit for absorption device 24 comprises a plurality of first temperature controlling passages for absorption device 23a (see FIG. 5) disposed in the each first temperature controlling plate 19b and a plurality of second temperature controlling passages for absorption device 24a (see FIG. 6) disposed in the each second temperature controlling plate 19c. Hereinafter, the first temperature controlling passage for absorption device 23a is simply referred to as a first temperature controlling passage 23a. Further, the second temperature controlling passage for absorption device 24a is simply referred to as a second temperature controlling passage 24a. The first temperature controlling passage 23a and the second temperature controlling passage 24a represent one example of a temperature controlling passage for absorption device of the present invention. Each of the absorption passages 22a, the first temperature controlling passages 23a, and the second temperature controlling passages 24a is so-called a microchannel (a minute passage). The first temperature controlling plate 19b, the second temperature controlling plate 19c, and the absorption plate 19a are repeatedly laminated in this order. That is, the first temperature controlling plate 19b serving as a first temperature controlling passage layer, where a plurality of the first temperature controlling passages 23a are arranged, the second temperature controlling plate 19c serving as a second temperature controlling passage layer, where a plurality of the second temperature controlling passages 24a are arranged, and the absorption plate 19a serving as an absorption passage layer, where a plurality of the absorption passages 22a are arranged, are repeatedly arranged side by side in this order in the laminate 20. The absorption plate 19a represents one example of an absorption passage layer of the present invention, while the first temperature controlling plate 19b and the second temperature controlling plate 19c represent one example of a temperature controlling passage layer of the present invention.

Figure 3:
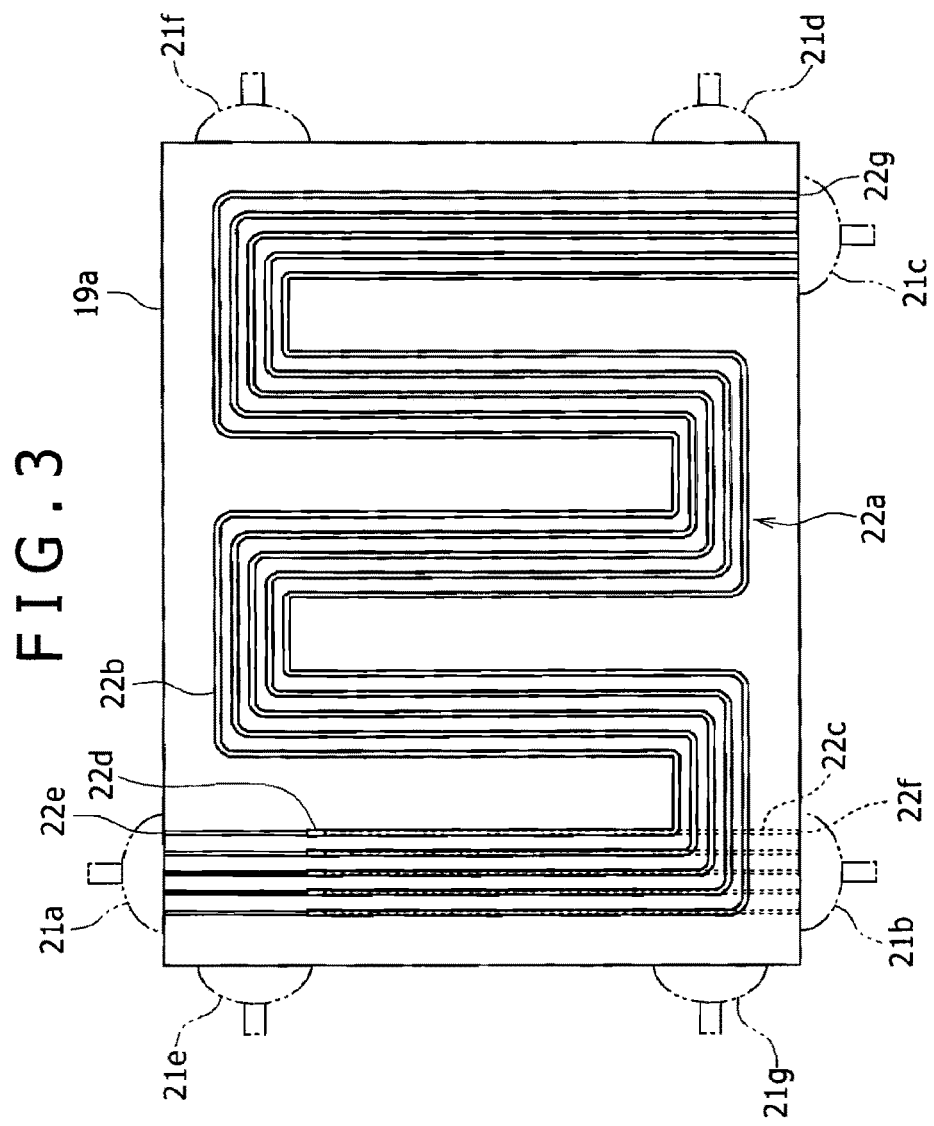
FIG. 3 is a plan view of an absorption plate constituting a laminate of the absorption device shown in FIG. 2, viewing from one plate surface side.
Figure 4:
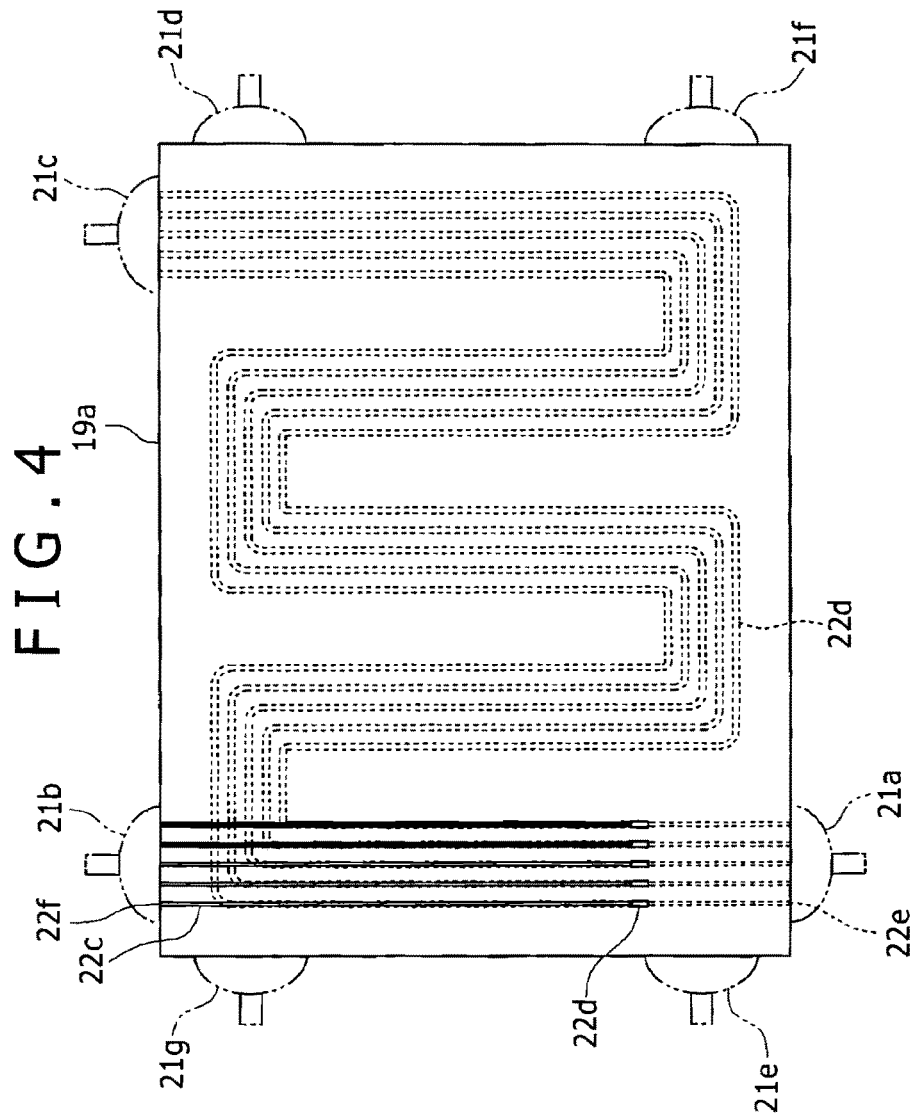
FIG. 4 is a plan view of the absorption plate shown in FIG. 3, viewing from the opposite plate surface side.

On one surface in a thickness direction of the each absorption plate 19a, a plurality of grooves 22b arranged side by side along the surface direction are formed as shown in FIG. 3. The each groove 22b has a starting end thereof at one side, among four sides, of the absorption plate 19a. The each groove 22b is extended from the starting end thereof while being repeatedly folded back to form a meandering shape. The each groove 22b has a terminal end thereof at the opposite side to the side, of the absorption plate 19a, where the starting end of the groove 22b is provided. On the other surface of the each absorption plate 19a, the opposite side to the one surface, a plurality of grooves 22c corresponding to the plurality of the grooves 22b on the one surface side are formed as shown in FIG. 4. A starting end of the each groove 22c is provided at the opposite side to the side, of the absorption plate 19a, where the starting end of the each groove 22b is provided. The each groove 22c is extended from the side, of the absorption plate 19a, where the starting end of the groove 22c is provided, toward the opposite side, so as to overlap with the corresponding groove 22b in a part linearly extended from the starting end of the groove 22b. At a position of a terminal end of the each groove 22c, a through hole 22d that penetrates the absorption plate 19a in a thickness direction and is connected to the corresponding groove 22b is provided. Then, an opening of the each groove 22b and an opening of the each through hole 22d formed on the one surface of the each absorption plate 19a are sealed by another plate laminated on the one surface of the absorption plate 19a. An opening of the each groove 22c and an opening of the each through hole 22d formed on the other surface of the each absorption plate 19a are sealed by another plate laminated on the other surface of the absorption plate 19a. By sealing the openings of the each groove 22b and 22c, and the each through hole 22d in this manner, the each absorption passage 22a is formed.

In the each absorption passage 22a, a part corresponding to the starting end of the each groove 22b serves as an inlet 22e for starting material gas of the absorption passage 22a. In the each absorption passage 22a, a part corresponding to the starting end of the each groove 22c serves as an inlet 22f for absorption liquid of the absorption passage 22a. Further, in the each absorption passage 22a, a part corresponding to the terminal end of the each groove 22b serves as an outlet 22g of the absorption passage 22a.

Figure 5:
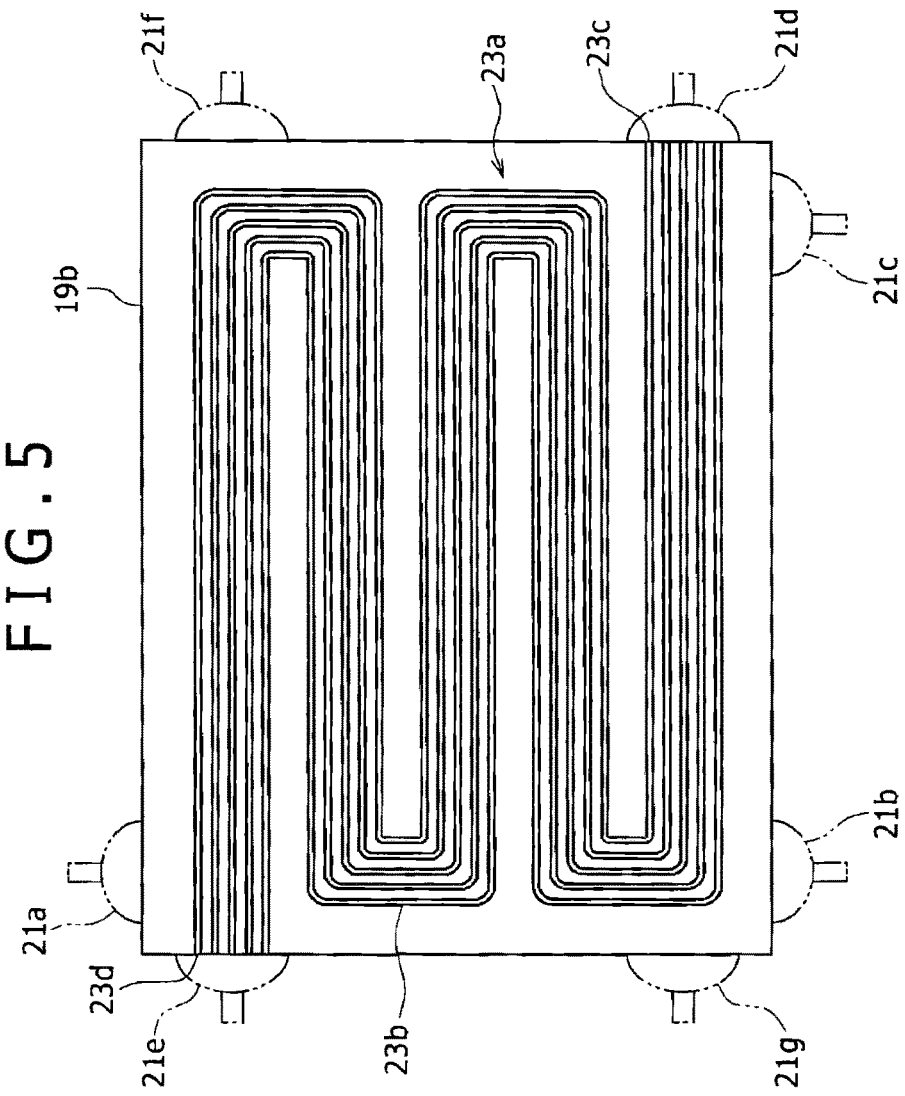
FIG. 5 is a plan view of a first temperature controlling plate for absorption device constituting the laminate of the absorption device shown in FIG. 2.

Further, on one surface in a thickness direction of the each first temperature controlling plate 19b, a plurality of grooves 23b arranged side by side along the surface direction are formed as shown in FIG. 5. The each groove 23b has a starting end thereof on a side orthogonal to the side where the inlet 22e for starting material gas of the absorption passage 22a is provided, among the four sides of the first temperature controlling plate 19b, at a position near the inlet 22e. The each groove 23b is extended from the starting end thereof in a direction orthogonal to the grooves 22b, while being repeatedly folded back, to form a meandering shape. The each groove 23b has a terminal end thereof on a side opposite to the side, of the first temperature controlling plate 19b, where the starting end of the groove 23b is provided. Then, an opening of the each groove 23b formed on one surface of the each first temperature controlling plate 19b is sealed by another plate laminated on the one surface of the first temperature controlling plate 19b. By sealing the opening of the each groove 23b, the each first temperature controlling passage 23a is formed. In the each first temperature controlling passage 23a, a part corresponding to the terminal end of the each groove 23b serves as an inlet 23c of the first temperature controlling passage 23a. In the each first temperature controlling passage 23a, a part corresponding to the starting end of the groove 23b serves as an outlet 23d of the first temperature controlling passage 23a.

Figure 6:
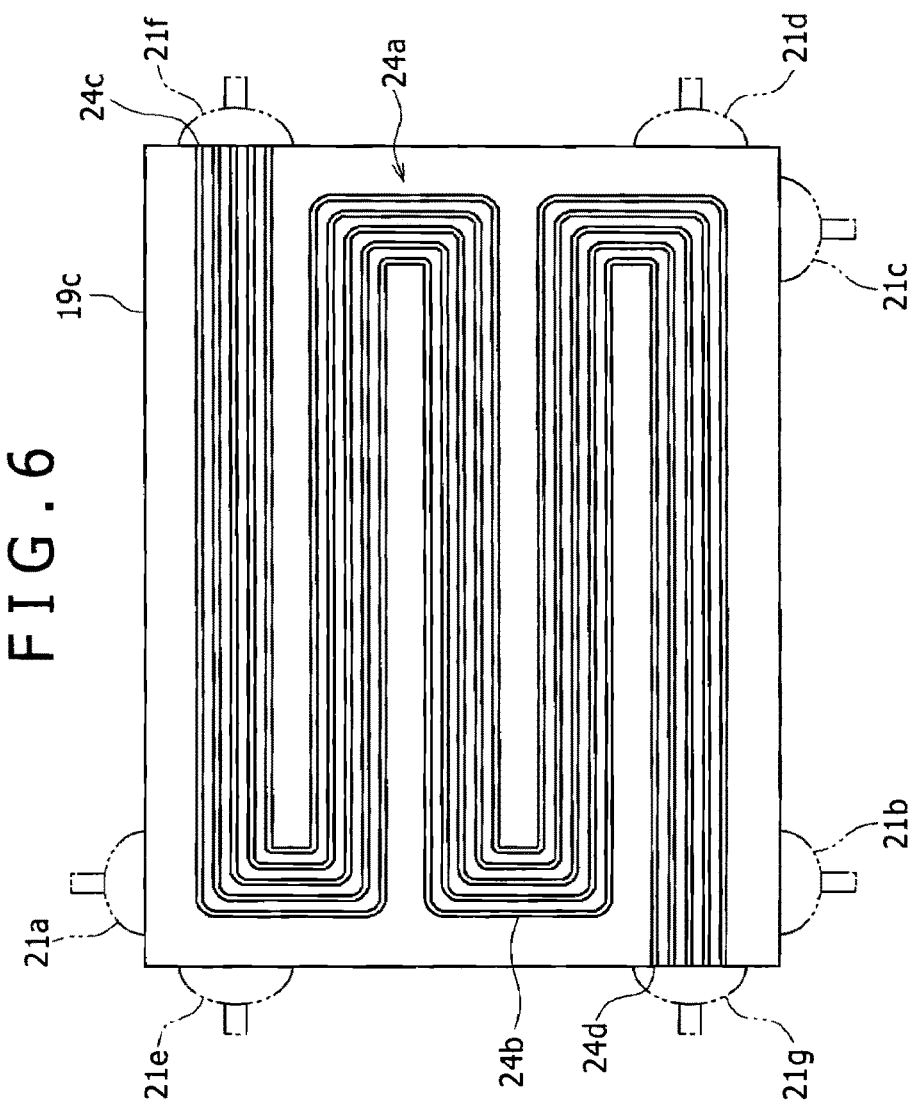
FIG. 6 is a plan view of a second temperature controlling plate for absorption device constituting the laminate of the absorption device shown in FIG. 2.

On one surface in a thickness direction of the each second temperature controlling plate 19c, a plurality of grooves 24b arranged side by side along the surface direction are formed as shown in FIG. 6. The each groove 24b has a starting end thereof on a side where the inlet 23c of the first temperature controlling passage 23a is provided, among the four sides of the second temperature controlling plate 19c. The each groove 24b is, as the groove 23b, extended from the starting end thereof while being repeatedly folded back to form a meandering shape. The each groove 24b has a terminal end thereof on a side opposite to the side, of the second temperature controlling plate 19c, where the starting end of the groove 24b is provided. By sealing an opening of the each groove 24b formed on one surface of the second temperature controlling plate 19c by another plate laminated on the one surface of the second temperature controlling plate 19c, a plurality of the second temperature controlling passages 24a are formed. In the each second temperature controlling passage 24a, a part corresponding to the starting end of the groove 24b serves as an inlet 24c of the second temperature controlling passage 24a. In the each second temperature controlling passage 24a, a part corresponding to the terminal end of the groove 24b serves as an outlet 24d of the second temperature controlling passage 24a.

Further, as shown in FIG. 2 to FIG. 6, the absorption device 2 comprises a starting material gas supply header 21a, an absorption liquid supply header 21b, a post-absorption mixed fluid discharge header 21c, a first temperature controlling supply header for absorption device 21d, a first temperature controlling discharge header for absorption device 21e, a second temperature controlling supply header for absorption device 21f, and a second temperature controlling discharge header for absorption device 21g. Hereinafter, the post-absorption mixed fluid discharge header 21c is simply referred to as a mixed fluid discharge header 21c. Further, the first temperature controlling supply header for absorption device 21d is simply referred to as a first temperature controlling supply header 21d. Further, the first temperature controlling discharge header for absorption device 21e is simply referred to as a first temperature controlling discharge header 21e. Further, the second temperature controlling supply header for absorption device 21f is simply referred to as a second temperature controlling supply header 21f. Further, the second temperature controlling discharge header for absorption device 21g is simply referred to as a second temperature controlling discharge header 21g.

The starting material gas supply header 21a is for supplying a starting material gas to the each absorption passage 22a. The absorption liquid supply header 21b is for supplying an absorption liquid to the each absorption passage 22a. The mixed fluid discharge header 21c is for collectively discharging a mixed fluid consisting of an absorption liquid having absorbed a desired component and a starting material gas from which the desired component has been absorbed, both being discharged from the each absorption passage 22a, as described below. The first temperature controlling supply header 21d is for supplying a desired component gas discharged from an expander 18, as described below, to the each first temperature controlling passage 23a as a temperature controlling fluid. The first temperature controlling discharge header 21e is for collectively discharging the desired component gas discharged from the each first temperature controlling passage 23a. The second temperature controlling supply header 21f is for supplying cooling medium to the each second temperature controlling passage 24a. The second temperature controlling discharge header 21g is for collectively discharging the cooling medium discharged from the each second temperature controlling passage 24a.

The starting material gas supply header 21a is attached to a side surface of the laminate 20, where the inlet 22e for starting material gas of the absorption passage 22a is provided, in such a manner as to entirely cover all the inlets 22e for starting material gas of the absorption passages 22a. The absorption liquid supply header 21b is attached to a side surface of the laminate 20, where the inlet 22f for absorption liquid of the absorption passage 22a is provided, in such a manner as to entirely cover all the inlets 22f for absorption liquid of the absorption passages 22a. The mixed fluid discharge header 21c is attached to a side surface of the laminate 20, where the outlet 22g of the absorption passage 22a is provided, in such a manner as to entirely cover all the outlets 22g of the absorption passages 22a. The first temperature controlling supply header 21d is attached to a side surface of the laminate 20, where the inlet 23c of the first temperature controlling passage 23a is provided, in such a manner as to entirely cover all the inlets 23c of the first temperature controlling passages 23a. The first temperature controlling discharge header 21e is attached to a side surface of the laminate 20, where the outlet 23d of the first temperature controlling passage 23a is provided, in such a manner as to entirely cover all the outlets 23d of the first temperature controlling passages 23a. The second temperature controlling supply header 21f is attached to a side surface of the laminate 20, where the inlet 24c of the second temperature controlling passage 24a is provided, in such a manner as to entirely cover all the inlets 24c of the second temperature controlling passages 24a. The second temperature controlling discharge header 21g is attached to a side surface of the laminate 20, where the outlet 24d of the second temperature controlling passage 24a is provided, in such a manner as to entirely cover all the outlets 24d of the second temperature controlling passages 24a. The absorption device 2 is installed in such a posture that a side surface of the laminate 20, where the first temperature controlling discharge header 21e and the second temperature controlling discharge header 21g are attached, faces downward, while an opposite side surface faces upward.

The absorption unit 22 is configured in such a manner that a starting material gas and an absorption liquid are introduced into the each absorption passage 22a and join together at a part of the through hole 22d. Then, it is configured that a mixed fluid formed by joining the starting material gas and the absorption liquid together circulates in the each absorption passage 22a overall from a lower part to an upper part of the absorption unit 22 (the laminate 20), during which a desired component in the starting material gas is absorbed into the absorption liquid. It is noted that absorption heat is generated by absorption of the desire component in the absorption unit 22. In the temperature controlling unit for absorption device 24, as described below, a desired component gas discharged from an expander 18 is introduced into the first temperature controlling passage 23a and also cooling medium having low temperature is introduced into the second temperature controlling passage 24a. The desired component gas introduced into the first temperature controlling passage 23a, while circulating in the first temperature controlling passage 23a, undergoes heat exchange with the mixed fluid circulating in the absorption passage 22a. The cooling medium introduced into the second temperature controlling passages 24a, while circulating in the second temperature controlling passage 24a, undergoes heat exchange with the mixed fluid circulating in the absorption passage 22a. By performing heat exchange in this manner, the absorption heat is removed. Further, by removing the heat in this manner, temperature of the mix fluid circulating in the absorption passage 22a is adjusted to appropriate temperature for the absorption of the desired component.

A regeneration device 4 (See FIG. 1) is a device for releasing a desired component from an absorption liquid having absorbed the desired component in the absorption device 2 and regenerating the absorption liquid into a state of a low desired component content. That is, the regeneration device 4 is a device for reducing a concentration of the desired component in the absorption liquid by releasing the desired component from the absorption liquid. The regeneration device 4 comprises a regeneration unit 26 for performing a regeneration process, in which a desired component in an absorption liquid is released to regenerate the absorption liquid, and a temperature controlling unit for regeneration device 28 for adjusting temperature of the absorption liquid circulating in the regeneration unit 26. FIG. 1 schematically shows the regeneration unit 26 and the temperature controlling unit for regeneration device 28. In reality, the regeneration device 4, as the absorption device 2, comprises a laminate consisting of a plenty of laminated plates, and a plenty of passages disposed inside the laminate form the regeneration unit 26 and the temperature controlling unit for regeneration device 28.

Figure 8:
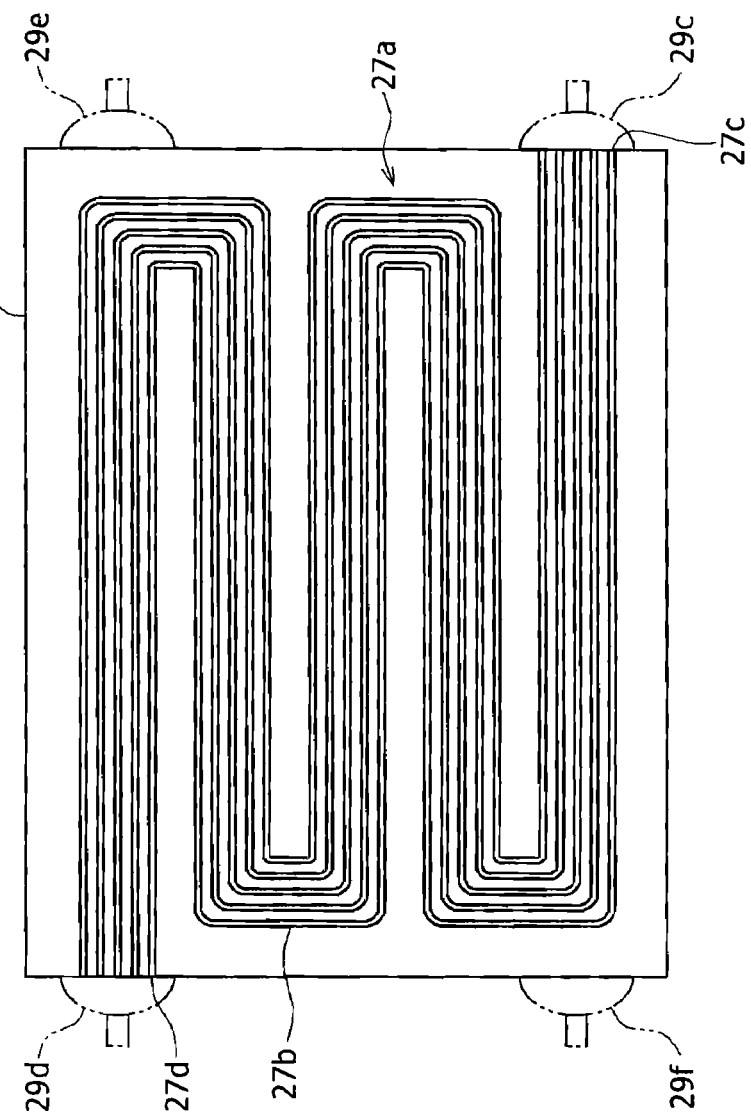
FIG. 8 is a plan view of a first temperature controlling plate for regeneration device constituting the laminate of the regeneration device of the separation device shown in FIG. 1.
Figure 9:
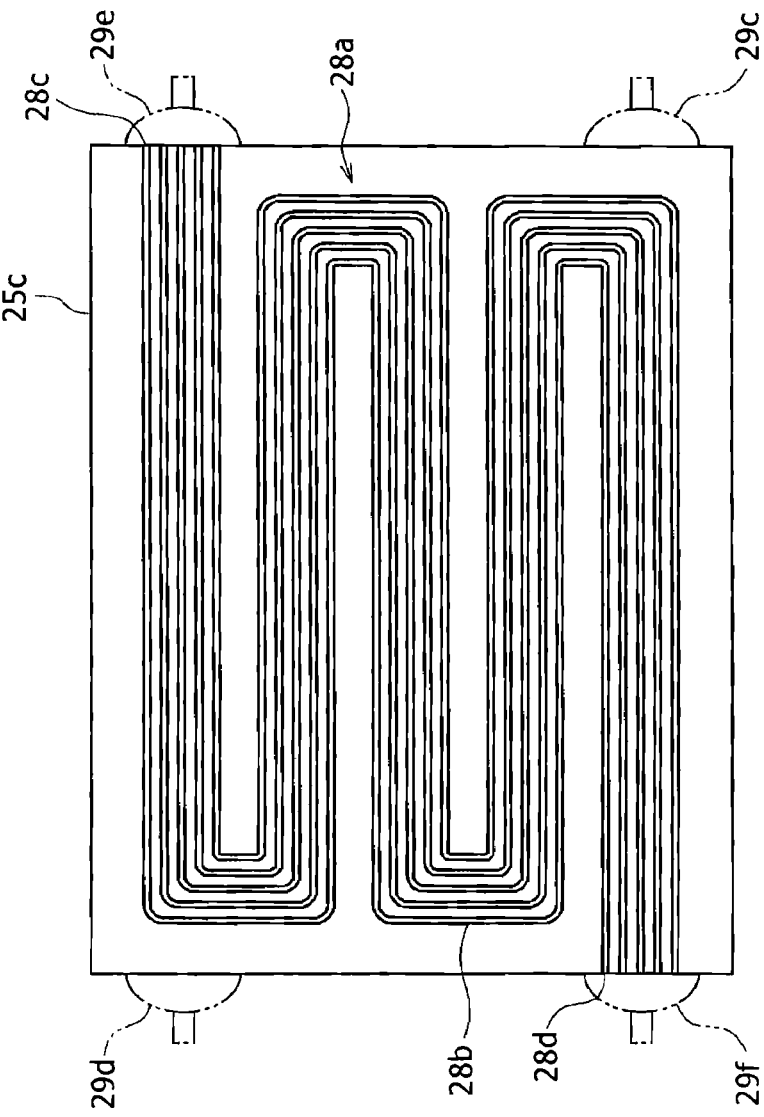
FIG. 9 is a plan view of a second temperature controlling plate for regeneration device constituting the laminate of the regeneration device of the separation device shown in FIG. 1.

Specifically, a plenty of plates forming the laminate of the regeneration device 4 comprises a plurality of regeneration plates 25a (see FIG. 7), a plurality of first temperature controlling plates for regeneration device 25b (see FIG. 8), and a plurality of second temperature controlling plates for regeneration device 25c (see FIG. 9). Hereinafter, the first temperature controlling plate for regeneration device 25b is simply referred to as a first temperature controlling plate 25b. Further, the second temperature controlling plate for regeneration device 25c is simply referred to as a second temperature controlling plate 25c. The regeneration unit 26 comprises a plurality of regeneration passages 26a (see FIG. 7) disposed in the each regeneration plate 25a. The temperature controlling unit for regeneration device 28 comprises a plurality of first temperature controlling passages for regeneration device 27a (see FIG. 8) disposed in the each first temperature controlling plate 25b and a plurality of second temperature controlling passages for regeneration device 28a (see FIG. 9) disposed in the each second temperature controlling plate 25c. Hereinafter, the first temperature controlling passage for regeneration device 27a is simply referred to as a first temperature controlling passage 27a. Further, the second temperature controlling passage for regeneration device 28a is simply referred to as a second temperature controlling passage 28a. The first temperature controlling passage 27a and the second temperature controlling passage 28a represent one example of a temperature controlling passage for regeneration device of the present invention. Each of the regeneration passages 26a, the first temperature controlling passages 27a, and the second temperature controlling passages 28 is so-called a microchannel (a minute passage). The first temperature controlling plate 25b, the second temperature controlling plate 25c, and the regeneration plate 25a are repeatedly laminated in this order. That is, the first temperature controlling plate 25b serving as a first temperature controlling passage layer, where a plurality of the first temperature controlling passages 27a are arranged, the second temperature controlling plate 25c serving as a second temperature controlling passage layer, where a plurality of the second temperature controlling passages 28a are arranged, and the regeneration plate 25a serving as an regeneration passage layer, where a plurality of the regeneration passages 26a are arranged, are repeatedly arranged side by side in this order in the laminate of the regeneration device 4. The regeneration plate 25a represents one example of a regeneration passage layer of the present invention, while the first temperature controlling plate 25b and the second temperature controlling plate 25c represent one example of a temperature controlling passage layer of the present invention.

Figure 7:
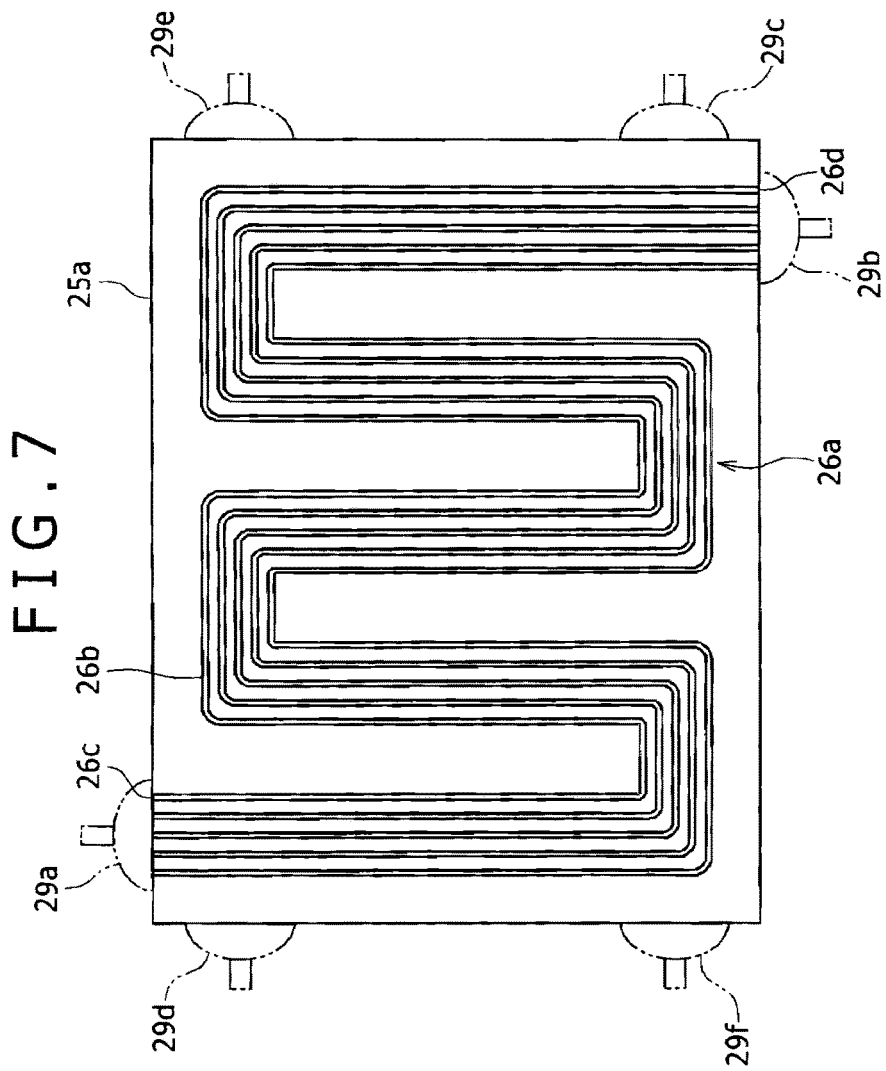
FIG. 7 is a plan view of a regeneration plate constituting a laminate of a regeneration device of the separation device shown in FIG. 1.

On one surface in a thickness direction of the each regeneration plate 25a, a plurality of grooves 26b arranged side by side along the surface direction are formed as shown in FIG. 7. The each groove 26b has a starting end thereof at one side among four sides of the regeneration plate 25a. The each groove 26b is extended from the starting end thereof while being repeatedly folded back to form a meandering shape. The each groove 26b has a terminal end thereof at the opposite side to the side, of the regeneration plate 25a, where the starting end of the groove 26b is provided. Then, an opening of the each groove 26b formed on one surface of the each regeneration plate 25a is sealed by another plate laminated on the one surface of the regeneration plate 25a. By sealing the opening of the each groove 26b, the each regeneration passage 26a is formed. In the each regeneration passage 26a, a part corresponding to the starting end of the each groove 26b serves as an inlet 26c of the regeneration passage 26a. In the each regeneration passage 26a, a part corresponding to the terminal end of the each groove 26b serves as an outlet 26d of the regeneration passage 26a.

Further, on one surface in a thickness direction of the each first temperature controlling plate 25b, a plurality of grooves 27b arranged side by side along the surface direction are formed as shown in FIG. 8. The each groove 27b has a starting end thereof on a side orthogonal to the side where the inlet 26c of the regeneration passage 26a is provided, among the four sides of the first temperature controlling plate 25b, at a position near the inlet 26c. The each groove 27b is extended from the starting end thereof in a direction orthogonal to the grooves 26b, while being repeatedly folded back, to form a meandering shape. The each groove 27b has a terminal end thereof on a side opposite to the side, of the first temperature controlling plate 25b, where the starting end of the groove 27b is provided. Then, an opening of the each groove 27b formed on one surface of the first temperature controlling plate 25b is sealed by another plate laminated on the one surface of the first temperature controlling plate 25b. By sealing the opening of the each groove 27b, the each first temperature controlling passage 27a is formed. In the each first temperature controlling passage 27a, a part corresponding to the terminal end of the groove 27b serves as an inlet 27c of the first temperature controlling passage 27a. In the each first temperature controlling passage 27a, a part corresponding to the terminal end of the groove 27b serves as an outlet 27d of the first temperature controlling passage 27a.

On one surface in a thickness direction of the each second temperature controlling plate 25c, a plurality of grooves 28b arranged side by side along the surface direction are formed as shown in FIG. 9. The each groove 28b has a starting end thereof on a side where the inlet 27c of the first temperature controlling passage 27a is provided, among the four sides of the second temperature controlling plate 25c. The each groove 28b is, as the groove 27b, extended from the starting end thereof while being repeatedly folded back to form a meandering shape. The each groove 28b has a terminal end thereof on a side opposite to the side, of the first temperature controlling plate 25b, where the starting end of the groove 28b is provided. An opening of the each groove 28b formed on one surface of the second temperature controlling plate 25c is sealed by another plate laminated on the one surface of the second temperature controlling plate 25c. By sealing the opening of the each groove 28b, the each second temperature controlling passage 28a is formed. In the each second temperature controlling passage 28a, a part corresponding to the starting end of the groove 28b serves as an inlet 28c of the second temperature controlling passage 28a. In the each second temperature controlling passage 28a, a part corresponding to the terminal end of the groove 28b serves as an outlet 28d of the second temperature controlling passage 28a.

Further, the regeneration device 4 comprises a post-absorption absorption liquid supply header 29a, a post-regeneration mixed fluid discharge header 29b, a first temperature controlling supply header for regeneration device 29c, a first temperature controlling discharge header for regeneration device 29d, a second temperature controlling supply header for regeneration device 29e, and a second temperature controlling discharge header for regeneration device 29f. Hereinafter, the post-absorption absorption liquid supply header 29a is simply referred to as an absorption liquid supply header 29a. Further, the post-regeneration mixed fluid discharge header 29b is simply referred to as a mixed fluid discharge header 29b. Further, the first temperature controlling supply header for regeneration device 29c is simply referred to as a first temperature controlling supply header 29c. Further, the first temperature controlling discharge header for regeneration device 29d is simply referred to as a first temperature controlling discharge header 29d. Further, the second temperature controlling supply header for regeneration device 29e is simply referred to as a second temperature controlling supply header 29e. Further, the second temperature controlling discharge header for regeneration device 29f is simply referred to as a second temperature controlling discharge header 29f.

The absorption liquid supply header 29a is for supplying an absorption liquid having absorbed a desired component from a starting material gas in the absorption unit 22 to the each regeneration passage 26a. The mixed fluid discharge header 29b is for collectively discharging a mixed fluid consisting of a regenerated absorption liquid and a desired component gas, both being discharged from the each regeneration passage 26a, as described below. The first temperature controlling supply header 29c is for supplying a compressed starting material gas discharged from a compressor 16, as described below, to the each first temperature controlling passage 27a as a temperature controlling fluid. The first temperature controlling discharge header 29d is for collectively discharging the starting material gas discharged from the each first temperature controlling passage 27a. The second temperature controlling supply header 29e is for supplying heating medium to the each second temperature controlling passage 28a. The second temperature controlling discharge header 29f is for collectively discharging the heating medium discharged from the each second temperature controlling passage 28a.

The absorption liquid supply header 29a is attached to a side surface of a laminate of the regeneration device 4, where the inlet 26c of the regeneration passage 26a is provided, in such a manner as to entirely cover all the inlets 26c of the regeneration passages 26a. The mixed fluid discharge header 29b is attached to a side surface of the laminate of the regeneration device 4, where the outlet 26d of the regeneration passage 26a is provided, in such a manner as to entirely cover all the outlets 26d of the regeneration passages 26a. The first temperature controlling supply header 29c is attached to a side surface of the laminate of the regeneration device 4, where the inlet 27c of the first temperature controlling passage 27a is provided, in such a manner as to entirely cover all the inlets 27c of the first temperature controlling passages 27a. The first temperature controlling discharge header 29d is attached to a side surface of the laminate of the regeneration device 4, where the outlet 27d of the first temperature controlling passage 27a is provided, in such a manner as to entirely cover all the outlets 27d of the first temperature controlling passages 27a. The second temperature controlling supply header 29e is attached to a side surface of the laminate of the regeneration device 4, where the inlet 28c of the second temperature controlling passage 28a is provided, in such a manner as to entirely cover all the inlets 28c of the second temperature controlling passages 28a. The second temperature controlling discharge header 29f is attached to a side surface of the laminate of the regeneration device 4, where the outlet 28d of the second temperature controlling passage 28a is provided, in such a manner as to entirely cover all the outlets 28d of the second temperature controlling passages 28a. The regeneration device 4 is installed in such a posture that the first temperature controlling supply header 29c and the second temperature controlling discharge header 29f are arranged at a lower part of the regeneration device 4 and the first temperature controlling discharge header 29d and the second temperature controlling supply header 29e are arranged at an upper part of the regeneration device 4.

The regeneration unit 26 is configured in such a manner that an absorption liquid having absorbed a desired component from a starting material gas in the absorption unit 22 is introduced into the each regeneration passage 26a. Then it is configured that, the introduced absorption liquid circulates in the each regeneration passage 26a overall from a lower part to an upper part of the regeneration unit 26, during which the absorption liquid releases the desired component and is regenerated into a state of a low desired component content. In the temperature controlling unit for regeneration device 28, as described below, a compressed starting material gas discharged from the compressor 16 is introduced into the first temperature controlling passage 27a, and also heating medium having high temperature (steam, etc.) is introduced into the second temperature controlling passage 28a. The starting material gas introduced into the first temperature controlling passage 27a, while circulating in the first temperature controlling passage 27a, undergoes heat exchange with the absorption liquid circulating in the regeneration passage 26a. The heating medium introduced into the second temperature controlling passage 28a, while circulating in the second temperature controlling passage 28a, undergoes heat exchange with the absorption liquid circulating in the regeneration passage 26a. By performing heat exchange in this manner, the absorption liquid is heated. Further, by heating in this manner, temperature of the absorption liquid circulating in the regeneration passage 26a is adjusted to appropriate temperature for releasing the desired component from the absorption liquid. The outlet 27d of the first temperature controlling passage 27a is connected to the inlet 22e for starting material gas of the each absorption passage 22a of the absorption unit 22 via the first temperature controlling discharge header 29d, a pipe, and the starting material gas supply header 21a in the absorption device 2. Thus, the starting material gas discharged from the first temperature controlling passage 27a of the temperature controlling unit for regeneration device 28 is introduced into the each absorption passage 22a of the absorption unit 22.

The absorption-side separator 6 (see FIG. 1) is connected to the outlet 22g of the each absorption passage 22a of the absorption unit 22 via the mixed fluid discharge header 21c and a pipe. From the outlet 22g of the each absorption passage 22a, a mixed fluid consisting of the absorption liquid having absorbed the desired component and the starting material gas from which the desired component has been absorbed in the absorption liquid, in the each absorption passage 22a, is discharged. The mixed fluid discharged from the outlet 22g is introduced into the absorption-side separator 6. The absorption-side separator 6 separates the mixed fluid introduced into the absorption-side separator 6 into the absorption liquid and the starting material gas by a difference in specific gravities of the both components. As the absorption-side separator 6, various known gas-liquid separators may be used. A gas outlet is provided at an upper part of the absorption-side separator 6. The starting material gas separated in the absorption-side separator 6 is discharged from this outlet. An outlet for absorption liquid is provided at a lower part of the absorption-side separator 6. The absorption liquid separated in the absorption-side separator 6 is discharged from this outlet. The outlet for absorption liquid of the absorption-side separator 6 is connected to the absorption-side pump 10 via a pipe.

The absorption-side pump 10 is for feeding the absorption liquid discharged from the absorption-side separator 6. The absorption-side pump 10 comprises a discharging part for discharging the absorption liquid. This discharging part is connected to the heat exchanger 14.

The regeneration-side separator 8 is connected to the outlet 26d of the each regeneration passage 26a of the regeneration unit 26 via the mixed fluid discharge header 29b and a pipe. From the outlet 26d of the each regeneration passage 26a, a mixed fluid consisting of the absorption liquid regenerated in the each regeneration passage 26a and the desired component gas released from the absorption liquid in the each regeneration passage 26a is discharged. The mixed fluid discharged from the outlet 26d is introduced into the regeneration-side separator 8. The regeneration-side separator 8 separates the mixed fluid introduced into the regeneration-side separator 8 into the absorption liquid and the desired component gas by a difference in specific gravities of the both components. As the regeneration-side separator 8, various known gas-liquid separators may be used. A gas outlet is provided at an upper part of the regeneration-side separator 8. The desired component gas separated in the regeneration-side separator 8 is discharged from this outlet. The gas outlet of the regeneration-side separator 8 is connected to an introduction port 42 of an expansion chamber 38 described below in the expander 18 via a pipe. An outlet for absorption liquid is provided at a lower part of the regeneration-side separator 8. The absorption liquid separated in the regeneration-side separator 8 is discharged from this outlet. The outlet for absorption liquid of the regeneration-side separator 8 is connected to the regeneration-side pump 12 via a pipe.

The regeneration-side pump 12 is for feeding the absorption liquid discharged from the regeneration-side separator 8. The regeneration-side pump 12 comprises a discharging part for discharging the absorption liquid. This discharging part is connected to the heat exchanger 14.

The heat exchanger 14 is an indirect heat exchanger. The heat exchanger 14 performs heat exchange between the absorption liquid discharged from the absorption-side separator 6 and fed by the absorption-side pump 10 and the absorption liquid discharged from the regeneration-side separator 8 and fed by the regeneration-side pump 12. By this heat exchange, the absorption liquid discharged from the absorption-side separator 6 is warmed to a certain extent, while the absorption liquid discharged from the regeneration-side separator 8 is cooled to a certain extent. A passage of the heat exchanger 14, in which the absorption liquid from the absorption-side separator 6 circulates, is connected to the absorption liquid supply header 29a of the regeneration device 4 via a pipe. By this connection, the passage of the heat exchanger 14, in which the absorption liquid from the absorption-side separator 6 circulates, is connected to the inlet 26c of the each regeneration passage 26a of the regeneration unit 26. A passage of the heat exchanger 14, in which the absorption liquid from the regeneration-side separator 8 circulates, is connected to the absorption liquid supply header 21b of the absorption device 2 via a pipe. By this connection, the passage of the heat exchanger 14, in which the absorption liquid from the regeneration-side separator 8 circulates, is connected to the inlet 22f for absorption liquid of the each absorption passage 22a of the absorption unit 22.

The compressor 16 is connected to a starting material gas supply source 20. The compressor 16 is for compressing a starting material gas supplied from the supply source 20. The compressor 16 comprises a discharge port for discharging the compressed starting material gas. This discharge port is connected to the first temperature controlling supply header 29c of the regeneration device 4. By this connection, this discharge part is connected to the inlet 27c of the first temperature controlling passage 27a of the temperature controlling unit for regeneration device 28. Thus, the starting material gas is compressed by the compressor 16 to generate compression heat in the starting material gas and the compressed starting material gas of which temperature is increased by the compression heat is introduced into the first temperature controlling passage 27a of the temperature controlling unit for regeneration device 28.

Figure 10:
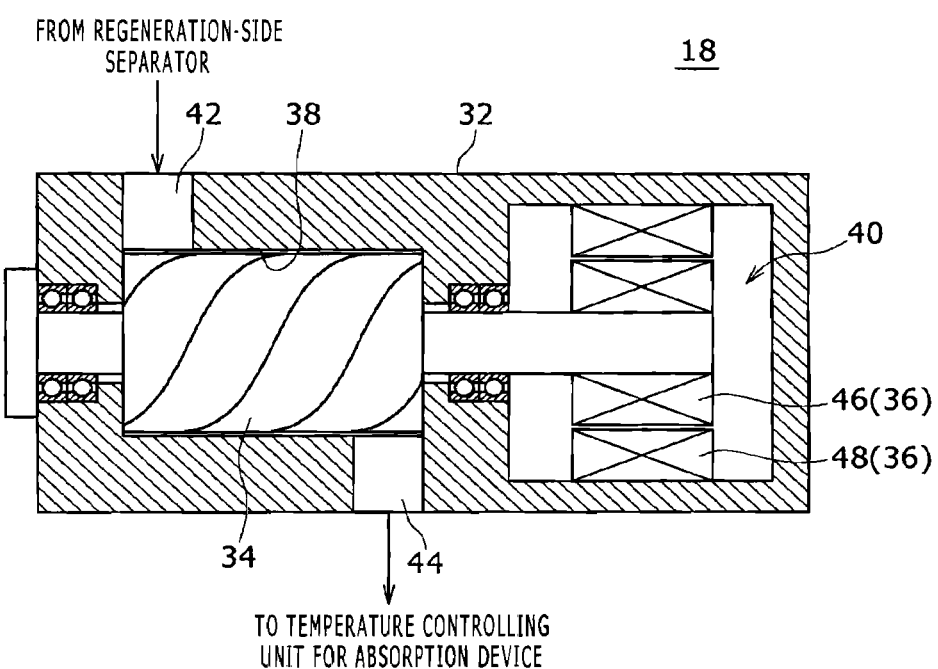
FIG. 10 is a schematic view of an internal structure of an expander of the separation device shown in FIG. 1.

The expander 18 generates power for driving the compressor 16 by using an expansion force of a gas. FIG. 10 schematically shows an internal structure of the expander 18. The expander 18, as shown in FIG. 10, comprises a casing 32, an expander rotor 34, and a generator 36.

Inside of the casing 32, an expansion chamber 38 and a generator chamber 40 are arranged adjacently to each other. Further, the casing 32 includes an introduction port 42 for introducing a desired component gas into the expansion chamber 38 and a lead-out port 44 for leading out an expanded desired component gas from the expansion chamber 38. The introduction port 42 is connected to the gas outlet of the regeneration-side separator 8. The lead-out port 44 is connected to the first temperature controlling supply header 21d. By this connection, the lead-out port 44 is connected to the inlet 23c of the first temperature controlling passage 23a.

The expander rotor 34 is housed inside of the expansion chamber 38 in a manner such that the expander rotor 34 freely rotates around an axis center thereof. The expander rotor 34 rotates by an expansion force of the desired component gas discharged from the regeneration-side separator 8 and introduced into the expansion chamber 38 via the introduction port 42. The desired component gas introduced into the expansion chamber 38 rotates the expander rotor 34 while expanding. Temperature of the desired component gas is decreased while it is expanding. The expanded desired component gas having low temperature is led out from the lead-out port 44.

The generator 36 is disposed inside of the generator chamber 40. The generator 36 generates power by a rotation force of the expander rotor 34. Specifically, the generator 36 comprises a generator rotor 46 attached to the rotation axis of the expander rotor 34 so as to share the same rotation axis and a stator 48 arranged so as to surround an outside part, in a radial direction, of the generator rotor 46. The generator rotor 46 rotates together with the expander rotor 34 with the rotation of the expander rotor 34. By the rotation of the generator rotor 46, power is generated between the generator rotor 46 and the stator 48. The generator 36 is connected to the compressor 16 (see FIG. 1) via an electric wire. The power generated in the generator 36 is supplied to the compressor 16 via the electric wire. The compressor 16 is driven by the supplied power and compresses a starting material gas.

Next, a method for separating a desired component from a starting material gas using the separation device 1 according to the present embodiments will be explained.

Referring to FIG. 1, a starting material gas containing a desired component as an object to be separated is supplied from the starting material gas supply source 20 to the compressor 16. The starting material gas is, for example, an exhaust gas discharged from a thermal power station, various combustion engines, and the like. The desired component is, for example, carbon dioxide contained in the exhaust gas. The compressor 16 compresses the supplied starting material gas and generates compression heat by the compression (compression process). The compressed starting material gas of which temperature is increased by the generated compression heat is supplied from the compressor 16 to the first temperature controlling passage 27a of the temperature controlling unit for regeneration device 28 (see FIG. 8) and circulates in the first temperature controlling passage 27a. Subsequently, the compressed starting material gas discharged from the first temperature controlling passage 27a is introduced into the each absorption passage 22a (See FIG. 3) of the absorption unit 22. Also, an absorption liquid is introduced from an absorption liquid supply source not illustrated to the each absorption passage 22a. As the absorption liquid, a liquid that selectively absorbs only the desired component in the starting material gas is used. Specifically, when the desired component is, for example, carbon dioxide, as the absorption liquid, an amine-based solvent, an aqueous solution of the amine-based solvent, an ionic liquid, water, or the like may be used.

The starting material gas and the absorption liquid introduced into the each absorption passage 22a are joined together and circulate in the each absorption passage 22a in a mutually contacted state. During a process in which the starting material gas and the absorption liquid are circulating in the each absorption passage 22a, the desired component is absorbed from the starting material gas to the absorption liquid (absorption process). In this absorption process, absorption heat is generated.

On the other hand, an expanded desired component gas having low temperature, discharged from the expander 18, is introduced and circulates in the first temperature controlling passage 23a (see FIG. 5), as described below. The absorption liquid and the starting material gas circulating in the each absorption passage 22a (see FIG. 3) undergo heat exchange with the desired component gas. Further, cooling medium having low temperature is introduced and circulates in the second temperature controlling passage 24a (see FIG. 6). The absorption liquid and the starting material gas circulating in the each absorption passage 22a also undergo heat exchange with the cooling medium circulating in the second temperature controlling passage 24a. By these heat exchanges, the absorption heat generated in the absorption process is removed.

From the each absorption passage 22a of the absorption unit 22, a mixed fluid consisting of an absorption liquid having absorbed a desired component and a starting material gas from which the desired component has been absorbed in the absorption liquid is discharged. The discharged mixed fluid is introduced into the absorption-side separator 6 (see FIG. 1). The mixed fluid introduced into the absorption-side separator 6 is separated into the absorption liquid containing the desired component and the starting material gas from which the desired component has been absorbed in the absorption liquid (post-absorption separation process).

The starting material gas from which the desired component has been absorbed is discharged from the outlet provided to the upper part of the absorption-side separator 6 and recovered. A gas discharged from the absorption-side separator 6 may be released into the atmosphere. The absorption liquid containing the desired component is discharged from the outlet provided to the lower part of the absorption-side separator 6 and sent to the each regeneration passage 26a (see FIG. 7) of the regeneration unit 26 via the heat exchanger 14 by the absorption-side pump 10. The absorption liquid introduced into the each regeneration passage 26a, while circulating in the each regeneration passage 26a, undergoes heat exchange with the compressed and heated starting material gas, circulating in the first temperature controlling passage 27a (see FIG. 8) of the temperature controlling unit for regeneration device 28. Further, heating medium with high temperature is introduced and circulates in the second temperature controlling passage 28a (see FIG. 9). The absorption liquid circulating in the each regeneration passage 26a also undergoes heat exchange with the heating medium circulating in the second temperature controlling passage 28a. By these heat exchanges, the absorption liquid circulating in the each regeneration passage 26a is heated. By this heating, the desired component gas is released from the absorption liquid. Then, by releasing the desired component gas, the absorption liquid is regenerated into an absorption liquid having a state of a low desired component content, before absorbing the desired component (regeneration process).

From the each regeneration passage 26a of the regeneration unit 26, a mixed fluid consisting of the released desired component gas and the regenerated absorption liquid is discharged. The discharged mixed fluid is introduced into the regeneration-side separator 8 (see FIG. 1). The mixed fluid introduced into the regeneration-side separator 8 is separated into the desired component gas and the regenerated absorption liquid (post-regeneration separation process).

The absorption liquid separated in the regeneration-side separator 8 is discharged from the outlet provided to the lower part of the regeneration-side separator 8 and sent to the each absorption passage 22a (see FIG. 3) of the absorption unit 22 via the heat exchanger 14 by the regeneration-side pump 12. By this, the regenerated absorption liquid is again used for absorbing the desired component from the starting material gas in the each absorption passage 22a. It is noted that when the regenerated absorption liquid passes through the heat exchanger 14 (see FIG. 1), this absorption liquid undergoes heat exchange with the absorption liquid containing the desired component, the absorption liquid being discharged from the absorption-side separator 6 and fed by the absorption-side pump 10. By this, the regenerated absorption liquid is cooled to a certain extent, while the absorption liquid containing the desired component is warmed to a certain extent.

On the other hand, the desired component gas separated in the regeneration-side separator 8 is discharged from the outlet provided to the upper part of the regeneration-side separator 8 and introduced into the expansion chamber 38 (see FIG. 10) via the introduction port 42 of the expander 18. The desired component gas introduced into the expansion chamber 38 rotates the expander rotor 34 by an expansion force of the desired component gas, while the desired component gas itself is expanding (expansion process). Temperature of the desired component gas drops to lower temperature as the desired component gas expands.

In accordance with a rotation of the expander rotor 34, the generator rotor 46 rotates integrally with the expander rotor 34 and generates power with the stator 48. The power thus generated is supplied to the compressor 16 (see FIG. 1) and used for driving the compressor 16.

The desired component gas of which temperature drops by expansion is discharged from the expansion chamber 38 via the lead-out port 44, and introduced into the first temperature controlling passage 23a (see FIG. 5). The desired component gas introduced into the first temperature controlling passage 23a removes the absorption heat while circulating in the first temperature controlling passage 23a, as described above, and subsequently is discharged from the first temperature controlling passage 23a and recovered.

The method for separating the desired component from the starting material gas using the separation device 1 according to the present embodiments is carried out as described above.

In the present embodiments, the starting material gas is compressed by the compressor 16 in the compression process to generate the compression heat in the starting material gas, thus the temperature of the starting material gas is increased. By using the compressed and heated starting material gas, the absorption liquid can be heated in order to release the desired component from the absorption liquid and regenerate the absorption liquid during the regeneration process in the regeneration device 4. Thus, a heat quantity separately supplied to heat the absorption liquid in the regeneration device 4 can be saved, and as a result, energy consumption can be reduced.

Further, in the present embodiments, the starting material gas of which pressure is increased by the compression in the compressor 16 is supplied to the absorption device 2. Thus, during the absorption process in the absorption device 2, the desired component can be absorbed from the starting material gas to the absorption liquid under a high pressure condition. As a result, an absorption amount of the absorption liquid per unit volume of the absorption liquid can be increased. That is, an absorption efficiency of the desired component from the starting material gas to the absorption liquid can be improved. Further, since the absorption efficiency of the desired component can be improved as described above, there is no need to increase a liquid volume of the absorption liquid and, as a result, an increase in size of the separation device 1 can be prevented.

Further since it is possible to reduce the liquid volume of the absorption liquid circulating in the separation device 1, sensible heat of the absorption liquid can be minimized in the separation device 1. Thus, a heat quantity required for heating the absorption liquid and releasing the desired component from the absorption liquid in the regeneration unit 26 can be reduced. The energy consumption can be reduced in this aspect too.

Further, in the present embodiments, after the desired component gas is released from the absorption liquid in the regeneration unit 26 and separated in the regeneration-side separator 8, an expansion force of the desired component gas is used to generate power in the generator 36 of the expander 18 and the compressor 16 is driven by the generated power to compress the starting material gas. Thus, energy (power) consumed for compressing the starting material gas can be reduced as compared to a case where the compressor 16 is driven by separately supplied energy to the compressor 16.

Further, in the present embodiments, in order to supply the power generated in the generator 36 of the expander 18 to the compressor 16, it is possible to employ a simple configuration such as mutually connecting the generator 36 and the compressor 16 by the electric wire. Thus, the configuration of the separation device 1 can be simplified as compared to a case where the rotation force of the expander rotor 34 is transmitted to the compressor 16 by a mechanical transmission mechanism, such as a rotation axis and a gear to drive the compressor 16.

Further, in the present embodiments, the desired component gas expanded in the expander 18 is supplied to the first temperature controlling passage 23a and undergoes heat exchange with the starting material gas and the absorption liquid circulating in the absorption passage 22a of the absorption unit 22. By this, the absorption heat generated in association with the absorption of the desired component from the starting material gas to the absorption liquid is removed. That is, in the present embodiments, by using the desired component gas of which temperature is decreased while it is expanding in the expander 18, the absorption heat generated during the absorption process in the absorption device 2 can be removed. Thus an amount of the cooling medium in use to remove the absorption heat can be reduced.

Further, in the present embodiments, the absorption of the desired component from the starting material gas to the absorption liquid is performed in the plurality of the absorption passages 22a formed as microchannels. Thus, the absorption of the desired component from the starting material gas to the absorption liquid can be performed in a state where a contact area of the absorption liquid per unit volume of the starting material gas is increased. Thus, the absorption efficiency of the desired component can be further improved.

Further, in the present embodiments, heat exchange is performed in the absorption device 2 between the starting material gas and the absorption liquid circulating in the absorption passage 22a formed as a microchannel in the laminate 20, and a fluid having low temperature (desired component gas after expansion and cooling medium) circulating in the first temperature controlling passage 23a and the second temperature controlling passage 24a, both of which are formed as microchannels and located adjacent to the absorption passage 22a in the same laminate 20. Thus, a heat exchange efficiency between the starting material gas and the absorbing liquid, and the fluid with low temperature can be improved. Thus, a heat removal efficiency of the absorption heat can be improved.

Further, in the present embodiments, heat exchange is performed in the regeneration device 4 between the absorption liquid circulating in the regeneration passage 26a formed as a microchannel in the laminate, and a fluid with high temperature (starting material gas after compression and heating medium) circulating in the first temperature controlling passage 27a and the second temperature controlling passage 28a, both of which are formed as microchannels and located adjacent to the regeneration passage 26a in the same laminate. Thus, a heat exchange efficiency between the absorbing liquid and the fluid with high temperature can be improved. Thus, a heating efficiency of the absorption heat can be improved. As a result, a release of the desired component from the absorption liquid in the regeneration passage 26a can be facilitated.

It is noted that the embodiments disclosed herein are exemplary in every aspect and should be understood as non-limiting. It is intended that the scope of the present invention is defined not by the foregoing embodiments but by the scope of the claims, and any modification within the scope of the claims or equivalent in meaning to the scope of the claims is included in the scope of the present invention.

Figure 11:
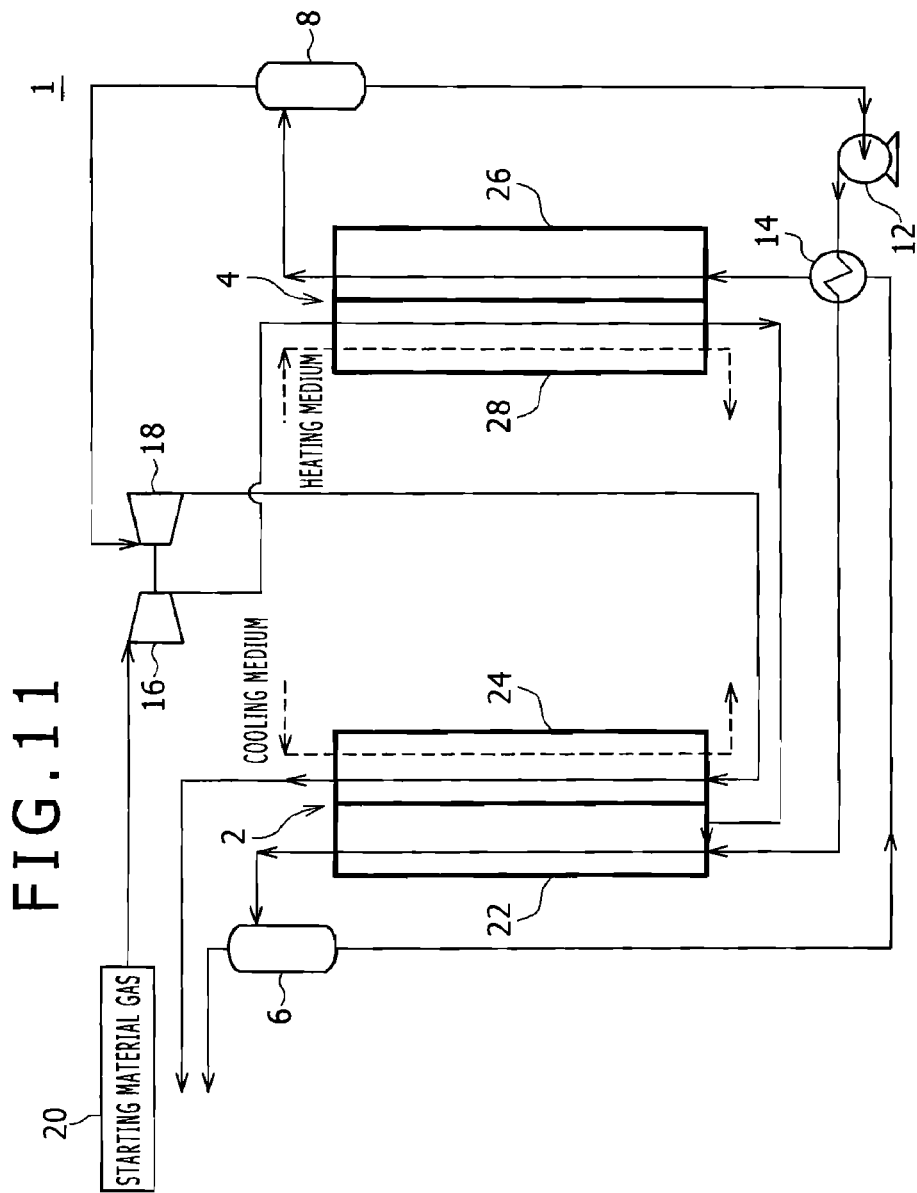
FIG. 11 is a schematic view of a configuration of a separation device according to a first modified example of one embodiment of the present invention.

For example, as a first modified example of the above embodiments shown in FIG. 11, the absorption-side separator 6 may be arranged in a height position not lower than the height of the regeneration-side separator 8. According to this configuration, the absorption liquid separated in the absorption-side separator 6 flows to a side of the regeneration-side separator 8, that is, a side of the regeneration unit 26 of the regeneration device 4, due to a siphon phenomenon. Thus, the absorption-side pump 10 (see FIG. 1) in the above embodiments can be omitted. Further the absorption liquid can be still supplied to the regeneration unit 26 even if the absorption-side pump 10 is omitted. As a result, the configuration of the separation device 1 can be simplified and energy required for driving the absorption-side pump 10 can be also saved.

Figure 12:
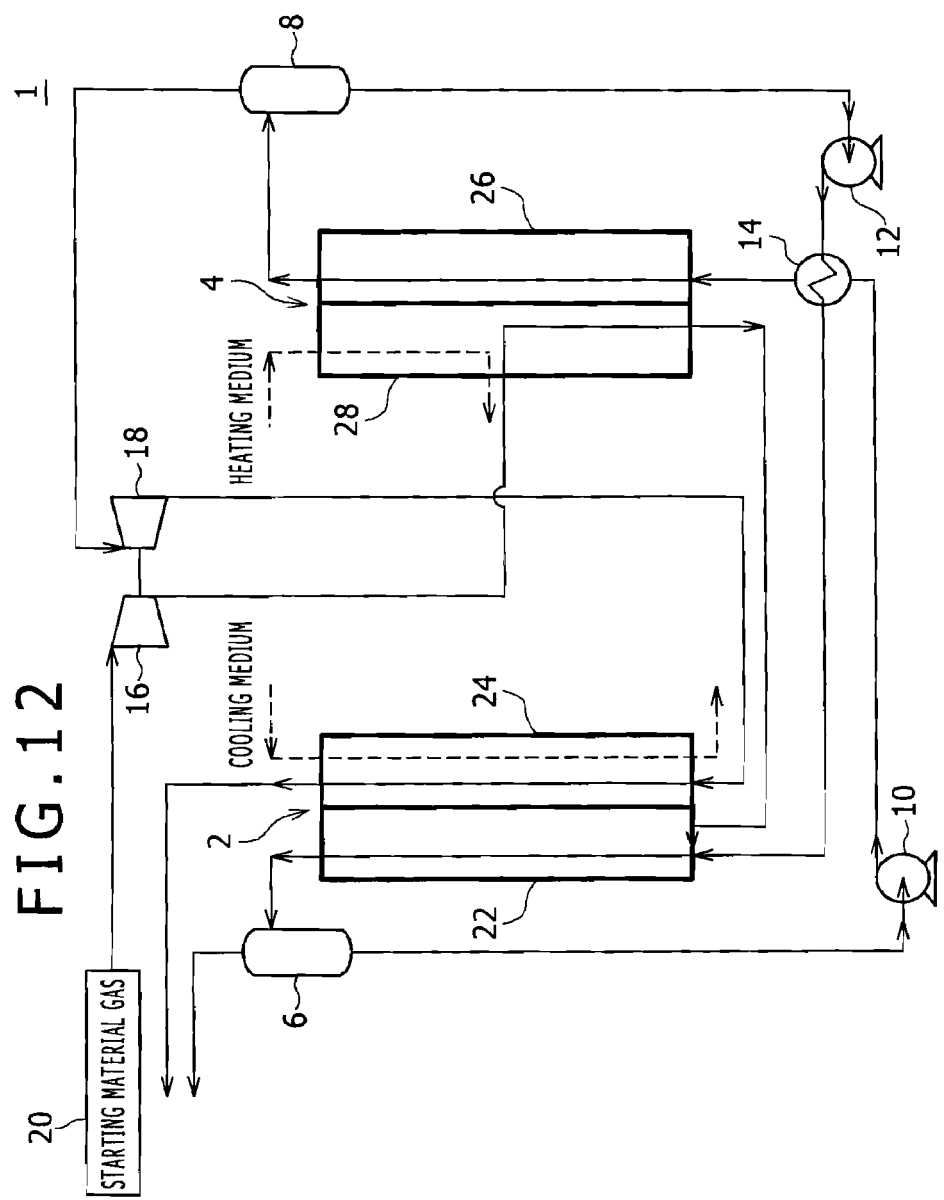
FIG. 12 is a schematic view of a configuration of a separation device according to a second modified example of one embodiment of the present invention.

Further, as a second modified example of the above embodiments shown in FIG. 12, the compressed starting material gas discharged from the compressor 16 may be allowed to flow in an area from a middle part to a lower end part, in a vertical direction, of the temperature controlling unit for regeneration device 28, and the heating medium may be allowed to flow in an area from an upper end part to the middle part, in a vertical direction, of the temperature controlling unit for regeneration device 28.

Figure 13:
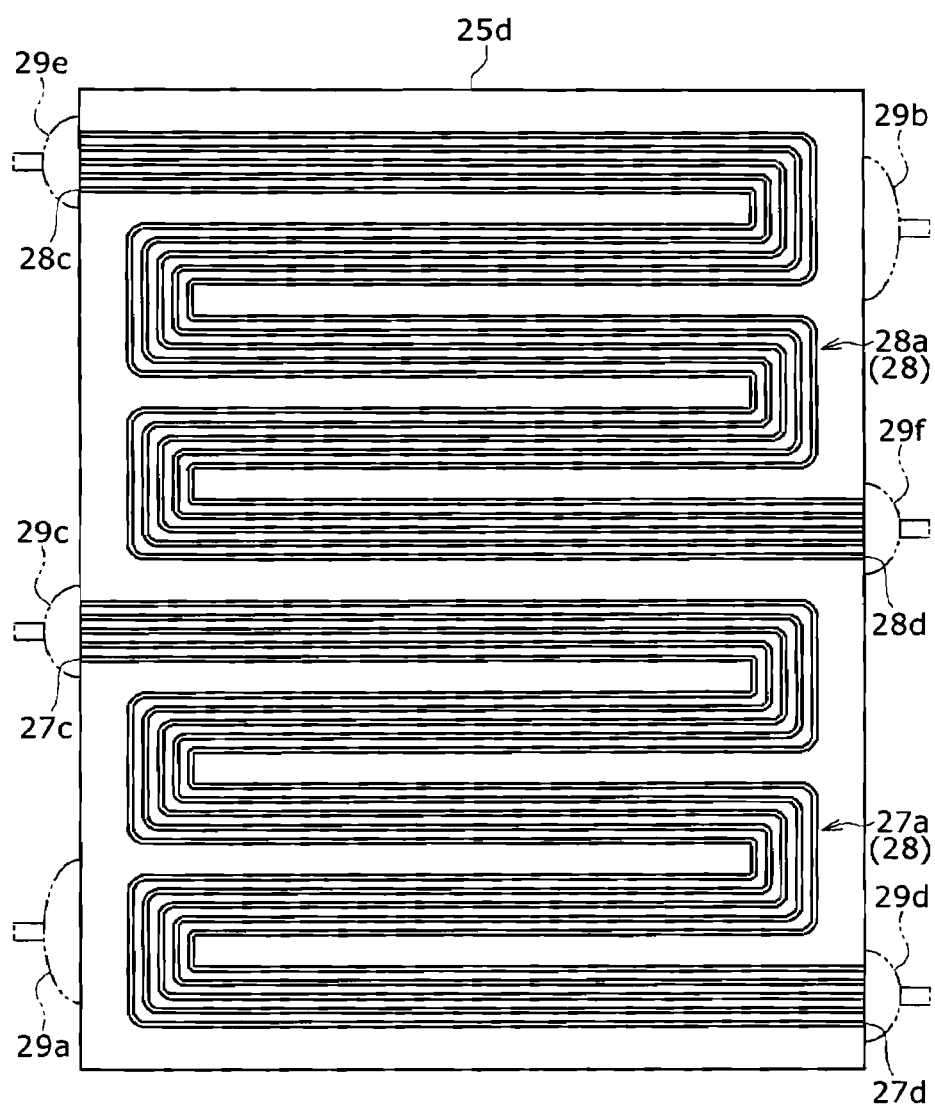
FIG. 13 is a plan view of a temperature controlling plate constituting a laminate of a regeneration device of the separation device shown in FIG. 12.

FIG. 13 shows a plan view of a temperature controlling plate for regeneration device 25d constituting a laminate of the regeneration device 4 in the second modified example. In the second modified example, as a temperature controlling plate, one kind of the temperature controlling plate for regeneration device 25d is provided. Hereinafter, the temperature controlling plate for regeneration device 25d is simply referred to as a temperature controlling plate 25d. In the temperature controlling plate 25d, a first temperature controlling passage 27a and a second temperature controlling 28a are formed.

Specifically, the first temperature controlling passage 27a, in which the compressed starting material gas circulates, is formed at a lower half of the laminate of the regeneration device 4, that is, at a lower half of the temperature controlling plate 25d. The first temperature controlling passage 27a is extended from one side edge of a middle part, in a vertical direction, of the temperature controlling plate 25d to the other side edge of a lower end part of the temperature controlling plate 25d, while being repeatedly folded back. Further, the second temperature controlling passage 28a, in which the heating medium circulates, is formed at an upper half of the laminate of the temperature controlling unit for regeneration device 28, that is, at an upper hall of the temperature controlling plate 25d. The second temperature controlling passage 28a is extended from one side edge of an upper end part of the temperature controlling plate 25d to the other side edge of the middle part of the temperature controlling plate 25d, while being repeatedly folded back.

A discharge port of the compressor 16 for discharging the compressed starting material gas is connected to the inlet 27c of the each first temperature controlling passage 27a via the first temperature controlling supply header 29c disposed one side part of the middle part of the temperature controlling unit for regeneration device 28. Thus, the compressed starting material gas discharged from the compressor 16 is introduced into the each first temperature controlling passage 27a. The compressed starting material gas introduced into the each first temperature controlling passage 27a flows in the each first temperature controlling passage 27a overall from the middle part to the lower end part of the temperature controlling unit for regeneration device 28. Then, the compressed starting material gas circulating in the each first temperature controlling passage 27a is discharged from the outlet 27d of the first temperature controlling passage 27a through the first temperature controlling discharge header 29d disposed on the other side part of the lower end part of the temperature controlling unit for regeneration device 28.

Further, the heating medium is introduced into the inlet 28c of the each second temperature controlling passage 28a via the second temperature controlling supply header 29e disposed one side part of the upper end part of the temperature controlling unit for regeneration device 28. The heating medium introduced into the each second temperature controlling passage 28a flows in the each second temperature controlling passage 28a overall from the upper end part to the middle part of the temperature controlling unit for regeneration device 28. Then, the heating medium circulating in the each second temperature controlling passage 28a is discharged from the outlet 28d of the second temperature controlling passage 28a through the second temperature controlling discharge header 29f disposed on the other side part of the middle part of the temperature controlling unit for regeneration device 28.

Figure 14:
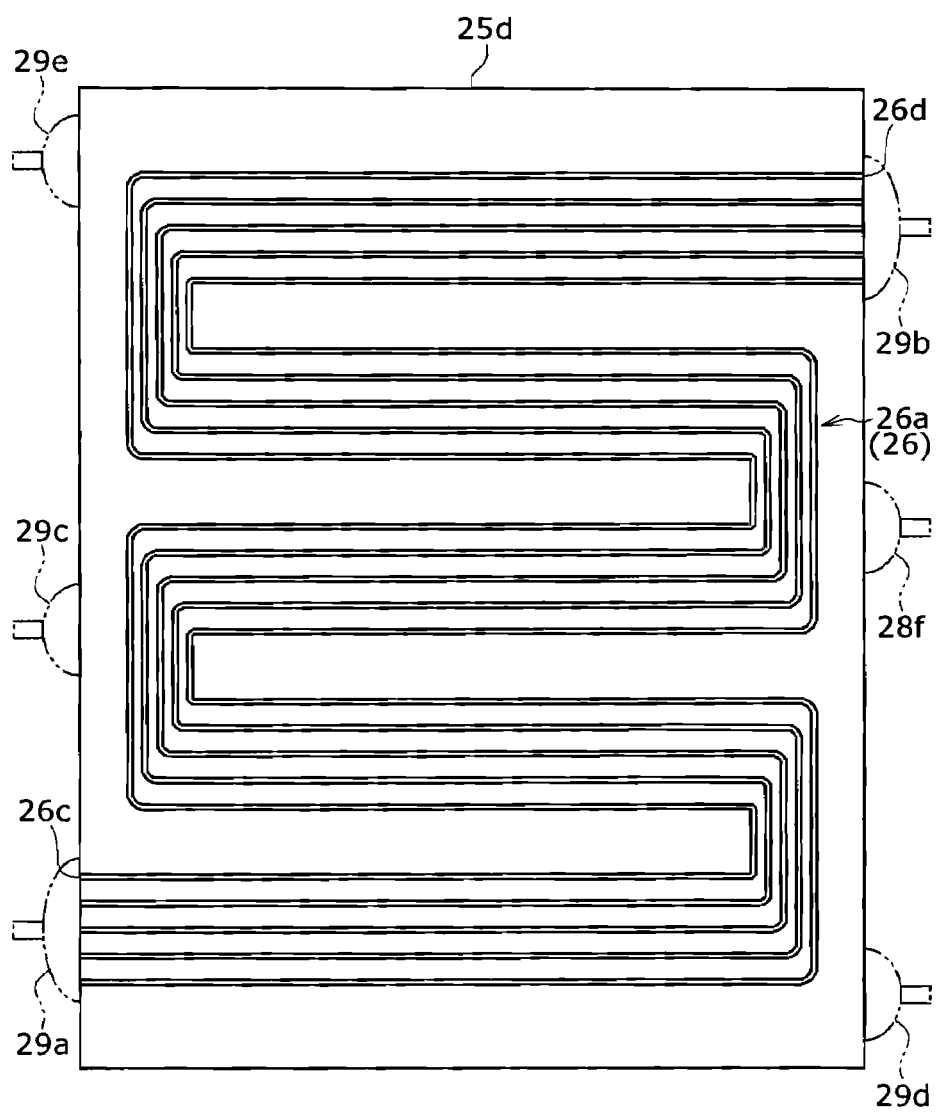
FIG. 14 is a plan view of a regeneration plate constituting the laminate of the regeneration device of the separation device shown in FIG. 12.

Further, FIG. 14 shows a plan view of a regeneration plate 25a constituting the laminate of the regeneration device 4 in the second modified example. A regeneration passage 26a is disposed in the regeneration plate 25a in an area approximately overlapping with the area where the first temperature controlling passage 27a and the second temperature controlling passage 28a of the temperature controlling plate 25d are disposed.

The absorption liquid is introduced into the each regeneration passage 26a of the regeneration unit 26 from the inlet 26c of the regeneration passage 26a via the absorption liquid supply header 29a. The absorption liquid introduced into the each regeneration passage 26a flows in the each regeneration passage 26a overall toward an upper part to an outlet 26d side. In this case, in a lower part of the regeneration unit 26, the desired component can be released from the absorption liquid with a relatively small heat quantity. However, as the flow proceeds to an upper part, the absorption liquid is more heated and the more desired components are released. Accordingly, a larger heat quantity is required for further releasing the desired components. In the second modified example, in a region from the lower part to the middle part of the regeneration unit 26, where the heat quantity required for releasing the desired component from the absorption liquid is relatively small, the absorption liquid is heated by heat exchange between the absorption liquid and the compressed starting material gas of which temperature is increased by the compression heat to release the desired component. Then, in a region from the middle part to the upper part of the regeneration unit 26, where the heat quantity required for releasing the desired component from the absorption liquid becomes larger, the absorption liquid is heated by heat exchange between the heating medium having higher temperature than the compressed starting material gas and the absorption liquid to release the desired component.

Figure 15:
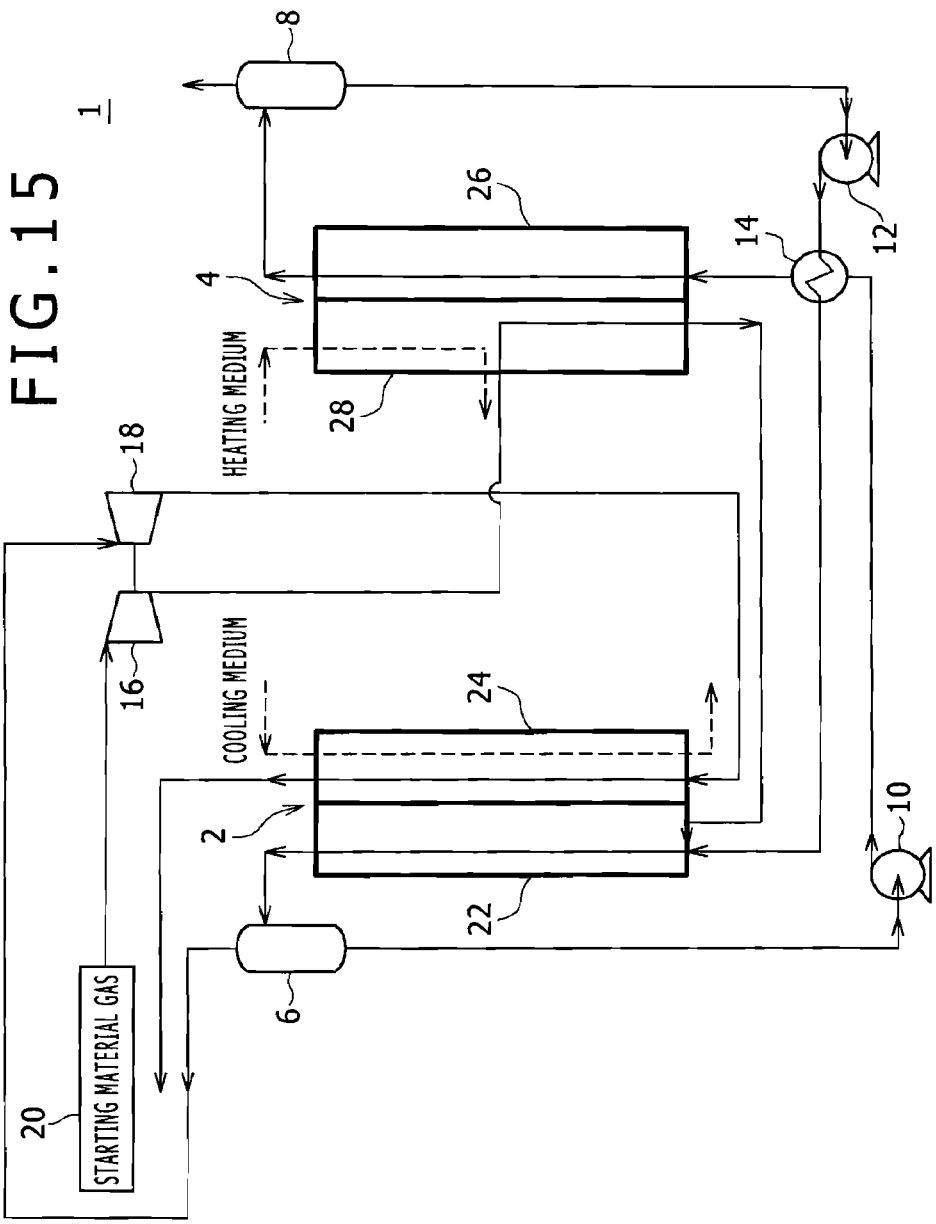
FIG. 15 is a schematic view of a configuration of a separation device according to a third modified example of one embodiment of the present invention.

Further, as a third modified example shown in FIG. 15, instead of the desired component gas discharged from the regeneration-side separator 8, the starting material gas from which the desired component has been absorbed, the starting material gas being discharged from the absorption-side separator 6, may be supplied to the expander 18. In the third modified example, the gas outlet of the regeneration-side separator 8 is not connected to the introduction port 42 (see FIG. 10) of the expansion chamber 38 in the expander 18, and the gas outlet of the absorption-side separator 6 is instead connected to the introduction port 42 of the expansion chamber 38 via a pipe. The starting material gas discharged from the absorption-side separator 6 has a relatively high pressure. In the third modified example, the starting material gas having a relatively high pressure is introduced into the expansion chamber 38 and the expander rotor 34 (see FIG. 10) is rotated by an expansion force of the stating material gas. Thereby, the generator rotor 46 is rotated and power is generated by the generator 36. The power generated by the generator 36 is supplied to the compressor 16 and used for driving the compressor 16. Also in the third modified example, the energy consumed for compressing the starting material gas can be reduced.

Further, for generating the power for driving the compressor 16, both the desired component gas discharged from the regeneration-side separator 8 and the starting material gas from which the desired component has been absorbed, discharged from the absorption-side separator 6, may be used. FIG. 16 shows a separation device 1 according to a fourth modified example, representing such an example.

The separation device 1 according to the fourth modified example comprises a first compressor 16, a second compressor 52, a first expander 18, and a second expander 54.

Configurations of the first compressor 16 and the first expander 18 are the same as the above-mentioned compressor 16 and expander 18, respectively. A starting material gas is supplied from the starting material supply source 20 to the second compressor 52. The second compressor 52 compresses the supplied starting material gas. A discharge port of the second compressor 52 for discharging the compressed starting material gas is connected to the inlet 27c of the first temperature controlling passage 27a (see FIG. 13) circulating the compressed starting material gas in the temperature controlling unit for regeneration device 28. With this configuration, both the compressed starting material gas discharged from the first compressor 16 and the compressed starting material gas discharged from the second compressor 52 are introduced into the first temperature controlling passage 27a.

An internal structure of the second expander 54 is the same as that of the above-mentioned expander 18. The gas outlet of the regeneration-side separator 8 is connected to the introduction port 42 (see FIG. 10) of the expansion chamber 38 in the first expander 18. The gas outlet of the absorption-side separator 6 is connected to an introduction port of an expansion chamber in the second expander 54. In the first expander 18, as in the above-mentioned expander 18, the expander rotor 34 (see FIG. 10) is rotated by an expansion force of the desired component gas, which is discharged from the regeneration-side separator 8 and introduced into the expansion chamber 38. The generator 36 generates power in accordance with a rotation of the expander rotor 34. The power generated by the generator 36 in the first expander 18 is supplied to the first compressor 16 and used for driving the first compressor 16. On the other hand, in the second expander 54, an expander rotor is rotated by an expansion force of the stating material gas from which the desired component has been absorbed, the stating material gas being discharged from the absorption-side separator 6 and introduced into the expansion chamber of the second expander 54. A generator of the second expander 54 generates power in accordance with a rotation of the expander rotor 34. The generator of the second expander 54 is connected to the second compressor 52 via an electric wire. The power generated by the generator of the second expander 54 is supplied to the second compressor 52 and used for driving the second compressor 52.

According to the fourth modified example, by using both the desired component gas discharged from the regeneration-side separator 8 and the starting material gas from which the desired component has been absorbed, discharged from the absorption-side separator 6, the power for driving the compressors 16 and 32 for compressing the starting material gas can be generated. Thus, the energy consumption can be further reduced.

Further, instead of driving the compressor by supplying the power generated by the generator in the expander to the compressor, as explained above, the compressor may be driven by kinetic energy generated by the expander, that is, by transmitting a rotation force of the expander rotor to the compressor by a mechanical transmission mechanism including a rotation axis and a gear.

Further, the separation device does not necessarily comprise the expander. Specifically, in order to supply power to the compressor, it is not necessary to generate power in the generator of the expander by using the desired component gas separated by the regeneration-side separator or the starting material gas from which the desired component has been absorbed, separated by the absorption-side separator. In this case, all power required for driving the compressor may be supplied to the compressor from a power source.

Overview of Embodiments

The following is a summary of the embodiments.

The separation method according to the embodiments is a method for separating a desired component from a starting material gas by using a separation device comprising: a absorption device for absorbing the desired component in the starting material gas, which is a mixed gas containing the desired component as an object to be separated, into an absorption liquid; and a regeneration device for releasing the desired component from the absorption liquid having absorbed the desired component in the absorption device and regenerating the absorption liquid. The separation method comprises: an absorption process for absorbing the desired component in the starting material gas into the absorption liquid by bringing the starting material gas and the absorption liquid into contact with each other inside of the absorption device; a regeneration process for releasing the desired component from the absorption liquid by heating the absorption liquid having absorbed the desired component in the absorption process, in the regeneration device, thereby regenerating the absorption liquid; a post-regeneration separation process for separating a mixed fluid consisting of the desired component released in the regeneration process and the regenerated absorption liquid into the desired component gas and the absorption liquid; and a compression process for compressing the starting material gas to generate compression heat in the starting material gas prior to the absorption process and the regeneration process. In the regeneration process, the absorption liquid is heated by supplying the starting material gas compressed in the compression process to the regeneration device and heat exchanging the starting material gas with the absorption liquid. In the absorption process, the starting material gas, which has been compressed in the compression process and undergone the heat exchange with the absorption liquid in the regeneration device, is supplied to the absorption device as a starting material gas from which the desired component is to be absorbed into the absorption liquid.

In this separation method, by compressing the starting material gas in the compression process, compression heat is generated in the starting material gas and temperature of the starting material gas is increased. By using the compressed and heated starting material gas, the absorption liquid can be heated in order to release the desired component from the absorption liquid and regenerate the absorption liquid in the regeneration process. Thus, a heat quantity separately supplied to heat the absorption liquid in the regeneration process can be saved. As a result, the energy consumption can be reduced. Further, in this separation method, the starting material gas of which pressure is increased by compression in the compression process is introduced into the absorption device. Thus, in the absorption process of the absorption device, the desired component in the starting material gas can be absorbed into the absorption liquid under a high pressure condition. As a result, an absorption efficiency of the desired component from the starting material to the absorption liquid can be improved. Further, since the absorption efficiency of the desired component can be improved in this manner, there is no need to increase a liquid volume of the absorption liquid. As a result, an increase in size of the separation device can be prevented.

In the above-mentioned separation method, as the separation device, a separation device in use may further comprise a compressor for compressing a starting material gas and an expander, which is driven by an expansion force of a supplied gas and generates energy. The separation method may further comprise an expansion process for expanding the desired component gas and driving the expander by an expansion force of the desired component gas, the desired component gas being separated in the post-regeneration separation process and supplied to the expander. In the compression process, energy generated by the expander may be supplied to the compressor, thereby driving the compressor by the supplied energy and allowing the compressor to compress the starting material gas.

According to this configuration, it is possible to generate energy in the expander by using an expansion force of the desired component gas, which is released from the absorption liquid in the regeneration process and separated in the post-regeneration separation process. Then, it is possible to compress the starting material gas by driving the compressor using the generated energy. Thus, the energy consumed for compressing the starting material gas can be saved as compared to a case where the compressor is driven by separately supplied energy to the compressor.

Further, in the above-mentioned separation method, as the separation device, a separation device in use may further comprise a compressor for compressing a starting material gas and an expander, which is driven by an expansion force of a supplied gas and generates energy. The separation method may further comprise an expansion process for expanding the starting material gas and driving the expander by an expansion force of the starting material gas, the starting material gas being one supplied to the expander after the desired component has been absorbed in the absorption liquid in the absorption process. In the compression process, energy generated by the expander may be supplied to the compressor, thereby driving the compressor by the supplied energy and allowing the compressor to compress the starting material gas.

According to this configuration, it is possible to generate energy in the expander by using an expansion force of the starting material gas from which the desired component has been absorbed in the absorption liquid in the absorption process. Then, it is possible to compress the starting material gas by driving the compressor using the generated energy. Thus, the energy consumed for compressing the starting material gas can be saved as compared to a case where the compressor is driven by separately supplied energy to the compressor.

In a configuration where the above-mentioned separation method comprises the compression process and the expansion process, it is preferred that, as the separation device, a separation device in use comprises, as the expander, an expander including an expander rotor that rotates by an expansion force of a gas supplied to the expander and a generator that generates power by a rotation force of the expander rotor and that, in the compression process, the power generated by the generator is supplied to the compressor as the energy.

In this configuration, the power generated by the generator in the expander is supplied to the compressor to drive the compressor. Thus, for supplying the power, a simple configuration such as mutually connecting the generator and the compressor by an electric wire can be employed. As a result, a configuration of the separation device can be simplified.

In a configuration where the above-mentioned separation method comprises the expansion process, it is preferred that, in the absorption process, the desired component gas expanded in the expansion process is supplied to the absorption device and subjected to heat exchange with the starting material gas and the absorption liquid in the absorption device, whereby the absorption heat generated by the absorption of the desired component from the starting material gas to the absorption liquid is removed.

According to this configuration, by using the desired component gas of which temperate is decreased while it expands in the expansion process, the absorption heat generated in the absorption process can be removed. Thus, an amount of the cooling medium used for removing the absorption heat can be reduced.

In the above-mentioned separation method, it is preferred that, as the separation device, a separation device in use comprises, as the absorption device, an absorption device including a laminate, on which an absorption passage layer in which a plurality of absorption passages formed as microchannels are arranged and a temperature controlling passage layer in which a plurality of temperature controlling passages for absorption device formed as microchannels are arranged, are laminated, and that, in the absorption process, the desired component in the starting material gas is absorbed in the absorption liquid while the starting material gas and the absorption liquid are circulated in the absorption passage in a mutually contacted state, a fluid having lower temperature than the starting material gas and the absorption liquid is circulated in the temperature controlling passage for absorption device, and heat exchange is performed between the fluid and the starting material gas and the absorption liquid circulating in the absorption passage, whereby the absorption heat generated by the absorption of the desired component from the starting material gas to the absorption liquid in the absorption passage is removed.

In this configuration, the absorption of the desired component from the starting material gas to the absorption liquid is performed in a plurality of the absorption passages formed as microchannels. Thus, the absorption of the desired component from the starting material gas to the absorption liquid can be performed in a state where a contact area of the absorption liquid per unit volume of the starting material gas is increased. As a result, the absorption efficiency of the desired component is further improved. Further, in this configuration, heat exchange is performed in the absorption device between the starting material gas and the absorption liquid circulating in the absorption passage formed as a microchannel in the laminate, and the fluid having low temperature circulating in the temperature controlling passage for absorption device, which is formed as a microchannel and located adjacent to the absorption passage in the same laminate. Thus, a heat exchange efficiency between the starting material gas and the absorption liquid, and the fluid with low temperature can be improved. As a result, a heat removal efficiency of the absorption heat can be improved.

The above-mentioned separation method preferably further comprises a post-absorption separation process for separating a mixed fluid consisting of the starting material gas from which the desired component has been absorbed in the absorption liquid in the absorption process and the absorption liquid having absorbed the desired component in the absorption process into the starting material gas and the absorption liquid, wherein the absorption liquid separated in the post-absorption separation process is supplied to the regeneration device by using a siphon phenomenon.

According to this configuration, the absorption liquid, which has absorbed the desired component in the absorption process and has been separated in the post-absorption separation process, can be supplied to the regeneration device without using a liquid feed pump. Thus, a configuration of the separation device can be simplified and energy consumed for driving a liquid feed pump can be saved.

In the above-mentioned separation method, it is preferred that, as the separation device, a separation device in use comprises, as the regeneration device, a regeneration device including a laminate, on which a regeneration passage layer in which a plurality of regeneration passages formed as microchannels are arranged and a temperature controlling passage layer in which a plurality of temperature controlling passages for regeneration device formed as microchannels are arranged, are laminated, and that, in the regeneration process, an absorption liquid having absorbed the desired component in the absorption process is circulated in the regeneration passage, the compressed starting material gas compressed in the compression process is circulated in the temperature controlling passage for regeneration device, and heat exchange is performed between the compressed starting material gas and the absorption liquid circulating in the regeneration passage, whereby the absorption liquid circulating in the regeneration passage is heated and the desired component is released from the absorption liquid.

In this configuration, heat exchange is performed in the regeneration device between the absorption liquid circulating in the regeneration passages formed as microchannels in the laminate and the compressed starting material gas circulating in the temperature controlling passages for regeneration device, which are formed as microchannels and located adjacent to the regeneration passages in the same laminate. Thus, a heat exchange efficiency between the absorption liquid and the compressed starting material gas can be improved. Thus, a heating efficiency of the absorption heat can be improved. As a result, a release of the desired component from the absorption liquid in the regeneration passage can be facilitated.

Further, the separation device according to the embodiments is a separation device for separating a desired component from a starting material gas, which is a mixed gas containing the desired component as an object to be separated, the separation device comprising: an absorption device for absorbing the desired component in the starting material gas into an absorption liquid by bringing the introduced starting material gas and the absorption liquid into contact with each other; a regeneration device for releasing the desired component from the absorption liquid having absorbed the desired component in the absorption device and regenerating the absorption liquid; a regeneration-side separator, connected to the regeneration device so that a mixed fluid consisting of the desired component gas released in the regeneration device and the regenerated absorbing liquid is introduced from the regeneration device to the regeneration-side separator, for separating the introduced mix fluid into the desired component gas and the absorption liquid; and a compressor for compressing the starting material gas to generate compression heat in the starting material gas. The regeneration device comprises: a regeneration unit, connected to the absorption device so that the absorption liquid having absorbed the desired component in the absorption device is introduced from the absorption device to the regeneration unit, for releasing the desired component from the introduced absorption liquid and regenerating the absorption liquid; and a temperature controlling unit for regeneration device, connected to the compressor so that the starting material gas compressed in the compressor is introduced from the compressor to the temperature controlling unit for regeneration device, for heating the absorption liquid introduced into the regeneration unit by performing heat exchange between the introduced starting material gas and the absorption liquid introduced into the regeneration unit. The absorption device is connected to the temperature controlling unit for regeneration device so that the starting material gas, which has been compressed by the compressor and undergone heat exchange with the absorption liquid in the temperature controlling unit for regeneration device, is introduced into the absorption device.

According to the separation device, the compressor compresses the starting material gas to generate compression heat, thereby increasing temperature of the starting material gas. By using the compressed and heated starting material gas, the absorption liquid can be heated to release the desired component from the absorption liquid and regenerate the absorption liquid in the regeneration device. Thus, a heat quantity separately supplied to heat the absorption liquid in the regeneration device can be saved. As a result, energy consumption can be reduced. Further, in this separation device, the starting material gas of which pressure is increased by compression in the compressor is supplied to the absorption device. Thus, in the absorption device, the desired component in the starting material gas can be absorbed into the absorption liquid under a high pressure condition. As a result, an absorption efficiency of the desired component from the starting material to the absorption liquid can be improved. Further, since the absorption efficiency of the desired component can be improved in this manner, there is no need to increase a liquid volume of the absorption liquid. As a result, an increase in size of the separation device can be prevented.

The above-mentioned separation device may further comprise an expander equipped with an expander rotor for generating energy by a rotation of the expander rotor, wherein the expander is connected to regeneration-side separator so that the desired component gas separated in the regeneration-side separator is introduced from the regeneration-side separator to the expander, the expander rotor rotates by an expansion force of the desired component gas introduced into the expander, and the compressor, connected to the expander so that energy generated in the expander is transmitted to the compressor, compresses the starting material gas by energy transmitted from the expander.

According to this configuration, the energy can be generated in the expander by using the expansion force of the desired component gas, which has been released from the absorption liquid in the regeneration device and separated in the regeneration-side separator. Then, the starting material gas can be compressed by the compressor driven by the generated energy. Thus, the energy consumed for compressing the starting material gas can be saved as compared to a case where the compressor is driven by separately supplied energy to the compressor.

The above-mentioned separation device may further comprise an expander equipped with an expander rotor for generating energy by a rotation of the expander rotor, wherein the expander is connected to the absorption device so that the starting material gas from which the desired component has been absorbed in the absorption liquid in the absorption device is introduced to the expander, the expander rotor rotates by an expansion force of the starting material gas introduced into the expander, and the compressor, connected to the expander so that energy generated in the expander is transmitted to the compressor, compresses the starting material gas by the energy transmitted from the expander.

According to this configuration, by using the expansion force of the starting material gas from which the desired component has been absorbed in the absorption liquid in the absorption device, energy can be generated in the expander. Then, the starting material gas can be compressed by the compressor driven by the generated energy. Thus, the energy consumed for compressing the starting material gas can be saved as compared to a case where energy is separately supplied to the compressor to drive the compressor.

In a configuration where the above-mentioned separation device comprises the compressor and the expander, it is preferred that the expander includes a generator for generating power by a rotation force of the expander rotor, and the compressor, electrically connected to the generator, is driven by the power generated in the generator.

In this configuration, the power generated in the generator in the expander is supplied to the compressor to drive the compressor. Thus, it is possible to employ a simple configuration such as connecting the generator and the compressor by an electric wire to supply the power. As a result, a configuration of the separation device can be simplified.

In a configuration where the above-mentioned separation device comprises the expander, it is preferred that the absorption device comprises an absorption unit for absorbing the desired component in the starting material gas into the absorption liquid by bringing the starting material gas and the absorption liquid, both introduced into the absorption device, into contact with each other and a temperature controlling unit for absorption device, connected to the expander so that the expanded desired component gas discharged from the expander is introduced to the temperature controlling unit for absorption device, for performing heat exchange between the desired component gas introduced from the expander, and the starting material gas and the absorption liquid introduced into the absorption unit, and removing absorption heat generated by absorption of the specific component from the starting material gas to the absorption liquid.

According to this configuration, by using the desired component gas of which temperature is decreased while it expands in the expander, the absorption heat generated in the abruption unit can be removed. Thus, an amount of cooling medium in use for removing the absorption heat can be reduced.

In the above-mentioned separation device, the absorption device preferably comprises a laminate, on which an absorption passage layer in which a plurality of absorption passages formed as microchannels are arranged for absorbing the desired component in the starting material gas into the absorption liquid while the introduced starting material gas and the absorption liquid are circulated in a mutually contacted state and a temperature controlling passage layer in which a plurality of temperature controlling passages for absorption device formed as microchannels are arranged for circulating a fluid of which temperature is lower than that of the starting material gas and the absorption liquid circulating in the absorption passages and performing heat exchange between the fluid and the starting material gas and the absorption liquid circulating in the absorption passages, thereby removing the absorption heat generated by the absorption of the specific component from the starting material gas to the absorption liquid in the absorption passages, are laminated.

In this configuration, the absorption of the desired component from the starting material gas to the absorption liquid is performed in the plurality of the absorption passages formed as microchannels. Thus, the absorption of the desired component from the starting material gas to the absorption liquid can be performed in a state where a contact area of the absorption liquid per unit volume of the starting material gas is increased. As a result, the absorption efficiency of the desired component can be further improved. Further, in this configuration, the heat exchange is performed in the absorption device between the starting material gas and the absorption liquid circulating in the absorption passages formed as microchannels in the laminate and the fluid having low temperature circulating in the temperature controlling passages for absorption device, which are formed as microchannels and located adjacent to the absorption passages in the same laminate. Thus, an efficiency of the heat exchange between the starting material gas and the absorption liquid, and the fluid having low temperature can be improved. As a result, a removal efficiency of the absorption heat can be improved.

It is preferred that the above-mentioned separation device further comprises an absorption-side separator, connected to the absorption device so that a mixed fluid consisting of the absorption liquid having absorbed the desired component in the absorption device and the starting material gas from which the desired component has been absorbed in the absorption liquid is introduced into the absorption-side separator, for separating the introduced mix fluid into the absorption liquid and the starting material gas, wherein the absorption-side separator is connected to the regeneration device and arranged in a height position not lower than a height of the regeneration-side separator, so that the absorption liquid separated in the absorption-side separator flows to the regeneration device by a siphon phenomenon.

According to this configuration, the absorption liquid, which has absorbed the desired component in the absorption device and has been separated in the absorption-side separator, can be supplied to the regeneration device without using a liquid feed pump. Thus, a configuration of the separation device can be simplified and energy consumed for driving a liquid feed pump can be saved.

In the above-mentioned separation device, it is preferred that the regeneration unit, connected to the absorption device so that the absorption liquid having absorbed the desired component in the absorption device is introduced into the regeneration unit, comprises a plurality of regeneration passages formed as microchannels for circulating the introduced absorption liquid, thereby releasing the desired component from the absorption liquid, and regenerating the absorption liquid, the temperature controlling unit for regeneration device, connected to the compressor so that the starting material gas compressed in the compressor is introduced into the temperature controlling unit for regeneration device, comprises a plurality of temperature controlling passages for regeneration device formed as microchannels for circulating the introduced starting material gas and performing heat exchange between the starting material gas and the absorption liquid circulating in the regeneration passages, thereby heating the absorption liquid circulating in the regeneration passages, and the regeneration device comprises a laminate, on which a regeneration passage layer in which a plurality of the regeneration passages are arranged and a temperature controlling passage layer in which a plurality of the temperature controlling passages for regeneration device are arranged, are laminated.

In this configuration, heat exchange is performed in the regeneration device between the absorption liquid circulating in the regeneration passages formed as microchannels in the laminate and the compressed starting material gas circulating the temperature controlling passages for regeneration device, which are formed as microchannels and located adjacent to the regeneration passages in the same laminate. Thus, an efficiency of the heat exchange between the absorption liquid and the compressed starting material gas can be improved. Thus, a heating efficiency of the absorption heat can be improved. As a result, a release of the desired component from the absorption liquid in the regeneration passages can be facilitated.

As described above, according to the embodiments, the absorption efficiency of the desired component in the absorption process can be improved while reducing energy consumption and preventing an increase in size of the separation device.

The invention claimed is:

1. A separation device for separating a desired component from a starting material gas, which is a mixed gas containing the desired component as an object to be separated, the separation device comprising:
   an absorber for absorbing the desired component in the starting material gas into an absorption liquid by bringing the introduced starting material gas and the absorption liquid into contact with each other;
   a regenerator for releasing the desired component from the absorption liquid having absorbed the desired component in the absorber and regenerating the absorption liquid;
   a regeneration-side separator, connected to the regenerator so that a mixed fluid consisting of the desired component gas released in the regenerator and a regenerated absorbing liquid is introduced from the regenerator to the regeneration-side separator, for separating the introduced mix fluid into the desired component gas and the absorption liquid;
a compressor for compressing the starting material gas to generate compression heat in the starting material gas, wherein:
the regenerator comprises: a regeneration unit, connected to the absorber so that the absorption liquid having absorbed the desired component in the absorber is introduced from the absorber to the regeneration unit, for releasing the desired component from the introduced absorption liquid and regenerating the absorption liquid; and a temperature controlling unit for the regenerator, connected to the compressor so that the starting material gas compressed in the compressor is introduced from the compressor to the temperature controlling unit for the regenerator, for heating the absorption liquid introduced into the regeneration unit by performing heat exchange between the introduced starting material gas and the absorption liquid introduced into the regeneration unit, and;
the absorber is connected to the temperature controlling unit for the regenerator so that the starting material gas, which has been compressed by the compressor and undergone heat exchange with the absorption liquid in the temperature controlling unit for the regenerator, is introduced into the absorber; and
an expander equipped with an expander rotor for generating energy by a rotation of the expander rotor;
the expander is connected to the regeneration-side separator so that the desired component gas separated in the regeneration-side separator is introduced from the regeneration-side separator to the expander;
the expander rotor rotates by an expansion force of the desired component gas introduced into the expander; and
the compressor is connected to the expander so that energy generated in the expander is transmitted to the compressor, to compress the starting material gas by the energy transmitted from the expander.

2. The separation device according to claim 1, wherein:
the separation device further comprises an expander equipped with an expander rotor for generating energy by a rotation of the expander rotor;
the expander is connected to the absorber so that the starting material gas from which the desired component has been absorbed in the absorption liquid in the absorber is introduced into the expander;
the expander rotor rotates by an expansion force of the starting material gas introduced into the expander; and
the compressor, connected to the expander so that energy generated in the expander is transmitted to the compressor, compresses the starting material gas by the energy transmitted from the expander.

3. The separation device according to claim 1, wherein:
the expander comprises a generator for generating power by a rotation force of the expander rotor; and
the compressor, electrically connected to the generator, is driven by the power generated in the generator.

4. The separation device according to claim 1, wherein the absorber comprises:
an absorption unit for absorbing the desired component in the starting material gas into the absorption liquid by bringing the starting material gas and the absorption liquid, both introduced into the absorber, into contact with each other; and
a temperature controlling unit for the absorber, connected to the expander so that the expanded desired component gas discharged from the expander is introduced to the temperature controlling unit for the absorber, for performing heat exchange between the desired component gas introduced from the expander, and the starting material gas and the absorption liquid introduced into the absorption unit, and removing absorption heat generated by absorption of the desired component from the starting material gas to the absorption liquid.

5. A separation device for separating a desired component from a starting material gas, which is a mixed gas containing the desired component as an object to be separated, the separation device comprising:
an absorber for absorbing the desired component in the starting material gas into an absorption liquid by bringing the introduced starting material gas and the absorption liquid into contact with each other;
a regenerator for releasing the desired component from the absorption liquid having absorbed the desired component in the absorber and regenerating the absorption liquid;
a regeneration-side separator, connected to the regenerator so that a mixed fluid consisting of the desired component gas released in the regenerator and a regenerated absorbing liquid is introduced from the regenerator to the regeneration-side separator, for separating the introduced mix fluid into the desired component gas and the absorption liquid; and
a compressor for compressing the starting material gas to generate compression heat in the starting material gas, wherein:
the regenerator comprises: a regeneration unit, connected to the absorber so that the absorption liquid having absorbed the desired component in the absorber is introduced from the absorber to the regeneration unit, for releasing the desired component from the introduced absorption liquid and regenerating the absorption liquid; and a temperature controlling unit for the regenerator, connected to the compressor so that the starting material gas compressed in the compressor is introduced from the compressor to the temperature controlling unit for the regenerator, for heating the absorption liquid introduced into the regeneration unit by performing heat exchange between the introduced starting material gas and the absorption liquid introduced into the regeneration unit, and;
the absorber is connected to the temperature controlling unit for the regenerator so that the starting material gas, which has been compressed by the compressor and undergone heat exchange with the absorption liquid in the temperature controlling unit for the regenerator, is introduced into the absorber,
wherein the absorber comprises a laminate, on which an absorption passage layer in which a plurality of absorption passages formed as microchannels are arranged for absorbing the desired component in the starting material gas into the absorption liquid while the introduced starting material gas and the absorption liquid are circulated in a mutually contacted state and a temperature controlling passage layer in which a plurality of temperature controlling passages for the absorber formed as microchannels are arranged for circulating a fluid of which temperature is lower than that of the starting material gas and the absorption liquid circulating in the absorption passages and performing heat exchange between the fluid and the starting material gas and the absorption liquid circulating in the absorption passages, thereby removing the absorption heat generated by the absorption of the desired component from the starting material gas to the absorption liquid in the absorption passages, are laminated.

6. A separation device for separating a desired component from a starting material gas, which is a mixed gas containing the desired component as an object to be separated, the separation device comprising:

an absorber for absorbing the desired component in the starting material gas into an absorption liquid by bringing the introduced starting material gas and the absorption liquid into contact with each other;

a regenerator for releasing the desired component from the absorption liquid having absorbed the desired component in the absorber and regenerating the absorption liquid;

a regeneration-side separator, connected to the regenerator so that a mixed fluid consisting of the desired component gas released in the regenerator and a regenerated absorbing liquid is introduced from the regenerator to the regeneration-side separator, for separating the introduced mix fluid into the desired component gas and the absorption liquid; and a compressor for compressing the starting material gas to generate compression heat in the starting material gas, wherein:

the regenerator comprises: a regeneration unit, connected to the absorber so that the absorption liquid having absorbed the desired component in the absorber is introduced from the absorber to the regeneration unit, for releasing the desired component from the introduced absorption liquid and regenerating the absorption liquid; and a temperature controlling unit for the regenerator, connected to the compressor so that the starting material gas compressed in the compressor is introduced from the compressor to the temperature controlling unit for the regenerator, for heating the absorption liquid introduced into the regeneration unit by performing heat exchange between the introduced starting material gas and the absorption liquid introduced into the regeneration unit, and;

the absorber is connected to the temperature controlling unit for the regenerator so that the starting material gas, which has been compressed by the compressor and undergone heat exchange with the absorption liquid in the temperature controlling unit for the regenerator, is introduced into the absorber, further comprising an absorption-side separator, connected to the absorber so that a mixed fluid consisting of the absorption liquid having absorbed the desired component in the absorber and the starting material gas from which the desired component has been absorbed in the absorption liquid is introduced into the absorption-side separator, for separating the introduced mixed fluid into the absorption liquid and the starting material gas, wherein the absorption-side separator is connected to the regenerator and arranged in a height position not lower than a height of the regeneration-side separator, so that the absorption liquid separated in the absorption-side separator flows to the regenerator by a siphon phenomenon.

7. A separation device for separating a desired component from a starting material gas, which is a mixed gas containing the desired component as an object to be separated, the separation device comprising:

an absorber for absorbing the desired component in the starting material gas into an absorption liquid by bringing the introduced starting material gas and the absorption liquid into contact with each other;

a regenerator for releasing the desired component from the absorption liquid having absorbed the desired component in the absorber and regenerating the absorption liquid;

a regeneration-side separator, connected to the regenerator so that a mixed fluid consisting of the desired component gas released in the regenerator and a regenerated absorbing liquid is introduced from the regenerator to the regeneration-side separator, for separating the introduced mix fluid into the desired component gas and the absorption liquid; and a compressor for compressing the starting material gas to generate compression heat in the starting material gas, wherein:

the regenerator comprises: a regeneration unit, connected to the absorber so that the absorption liquid having absorbed the desired component in the absorber is introduced from the absorber to the regeneration unit, for releasing the desired component from the introduced absorption liquid and regenerating the absorption liquid; and a temperature controlling unit for the regenerator, connected to the compressor so that the starting material gas compressed in the compressor is introduced from the compressor to the temperature controlling unit for the regenerator, for heating the absorption liquid introduced into the regeneration unit by performing heat exchange between the introduced starting material gas and the absorption liquid introduced into the regeneration unit, and;

the absorber is connected to the temperature controlling unit for the regenerator so that the starting material gas, which has been compressed by the compressor and undergone heat exchange with the absorption liquid in the temperature controlling unit for the regenerator, is introduced into the absorber, wherein:

the regeneration unit, connected to the absorber so that the absorption liquid having absorbed the desired component in the absorber is introduced into the regeneration unit, comprises a plurality of regeneration passages formed as microchannels for circulating the introduced absorption liquid, thereby releasing the desired component from the absorption liquid and regenerating the absorption liquid;

the temperature controlling unit for the regenerator, connected to the compressor so that the starting material gas compressed in the compressor is introduced into the temperature controlling unit for the regenerator, comprises a plurality of temperature controlling passages for the regenerator formed as microchannels for circulating the introduced starting material gas and performing heat exchange between the starting material gas and the absorption liquid circulating in the regeneration passages, thereby heating the absorption liquid circulating in the regeneration passages; and the regenerator comprises a laminate on which a regeneration passage layer in which a plurality of the regeneration passages are arranged and a temperature controlling passage layer in which a plurality of the temperature controlling passages for the regenerator are laminated.

* * * * *